(12) United States Patent
Chang et al.

(10) Patent No.: US 8,788,739 B2
(45) Date of Patent: Jul. 22, 2014

(54) HYPERVISOR-BASED MANAGEMENT OF LOCAL AND REMOTE VIRTUAL MEMORY PAGES

(75) Inventors: Jichuan Chang, Mountain View, CA (US); Kevin Lim, Ann Arbor, MI (US); Partha Ranganathan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 13/259,113

(22) PCT Filed: Jun. 29, 2009

(86) PCT No.: PCT/US2009/049036
§ 371 (c)(1),
(2), (4) Date: Sep. 22, 2011

(87) PCT Pub. No.: WO2011/002436
PCT Pub. Date: Jan. 6, 2011

(65) Prior Publication Data
US 2012/0030406 A1  Feb. 2, 2012

(51) Int. Cl.
*G06F 12/12* (2006.01)
*G06F 12/02* (2006.01)
(52) U.S. Cl.
CPC ............ *G06F 12/126* (2013.01); *G06F 12/023* (2013.01); *G06F 2212/2542* (2013.01); *G06F 2212/50* (2013.01)
USPC ............................................. 711/6; 711/165

(58) Field of Classification Search
CPC ...... G06F 12/123; G06F 12/026; G06F 12/12; G06F 12/0238; G06F 12/08; G06F 13/385; G06F 13/14; G06F 2212/2542; G06F 2212/254; G06F 2212/50
USPC ................................ 711/6, 165; 718/104, 105
See application file for complete search history.

(56) References Cited

U.S. PATENT DOCUMENTS

| 7,330,942 | B2 | 2/2008 | Dinechin et al. | |
|---|---|---|---|---|
| 7,543,109 | B1* | 6/2009 | Bell et al. | 711/113 |
| 2004/0193829 | A1* | 9/2004 | Woo et al. | 711/170 |
| 2006/0294330 | A1* | 12/2006 | Stanfill | 711/159 |
| 2007/0198656 | A1* | 8/2007 | Mazzaferri et al. | 709/218 |
| 2007/0294496 | A1* | 12/2007 | Goss et al. | 711/163 |
| 2008/0077767 | A1 | 3/2008 | Khosravi et al. | |
| 2008/0294846 | A1* | 11/2008 | Bali et al. | 711/118 |
| 2009/0006714 | A1 | 1/2009 | Durham et al. | |
| 2009/0006801 | A1* | 1/2009 | Shultz et al. | 711/170 |

(Continued)

OTHER PUBLICATIONS

International Search Report and Written Opinion for PCT Application No. PCT/US2009/049036, mailed Feb. 1, 2010, pp. 11.

*Primary Examiner* — Hal Schnee

(57) ABSTRACT

A system and method is illustrated for comparing a target memory address and a local memory size using a hypervisor module that resides upon a compute blade, the comparison based upon a unit of digital information for the target memory address and an additional unit of digital information for the local memory size. Additionally, the system and method utilizes swapping of a local virtual memory page with a remote virtual memory page using a swapping module that resides on the hypervisor module, the swapping based upon the comparing of the target memory address and the local memory size. Further, the system and method is implemented to transmit the local virtual memory page to a memory blade using a transmission module that resides upon the compute blade.

7 Claims, 21 Drawing Sheets

(56) References Cited

U.S. PATENT DOCUMENTS

| | | |
|---|---|---|
| 2009/0150625 A1* | 6/2009 | Evanchik et al. ............. 711/159 |
| 2009/0328073 A1* | 12/2009 | Tripathi ....................... 719/319 |
| 2010/0106930 A1* | 4/2010 | Foltz et al. ................... 711/165 |
| 2010/0161908 A1* | 6/2010 | Nation et al. ................. 711/147 |
| 2010/0169253 A1* | 7/2010 | Tan ................................ 706/21 |
| 2010/0217952 A1* | 8/2010 | Iyer et al. ..................... 711/209 |
| 2012/0185854 A1* | 7/2012 | Dahlstedt ......................... 718/1 |

\* cited by examiner

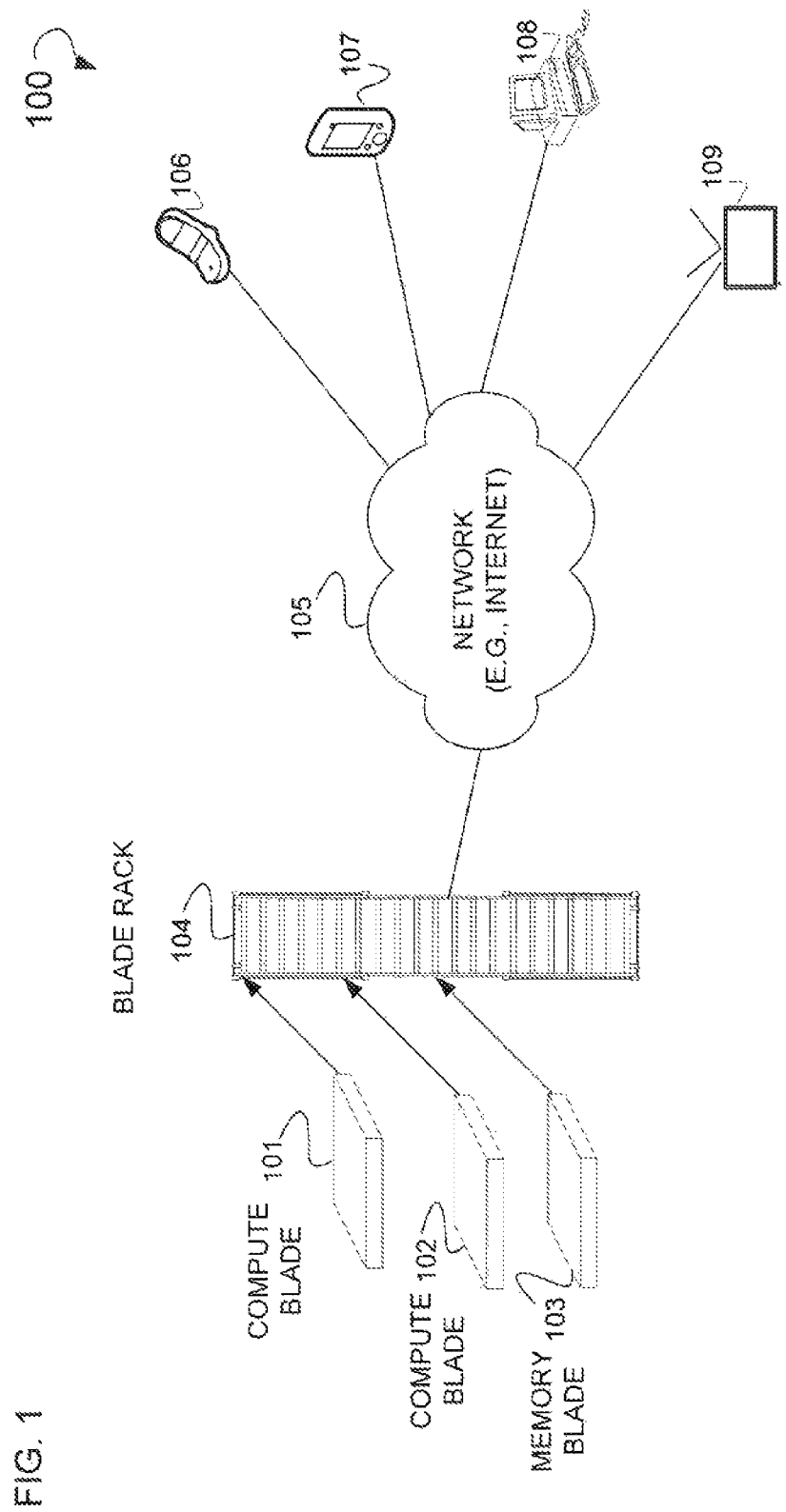

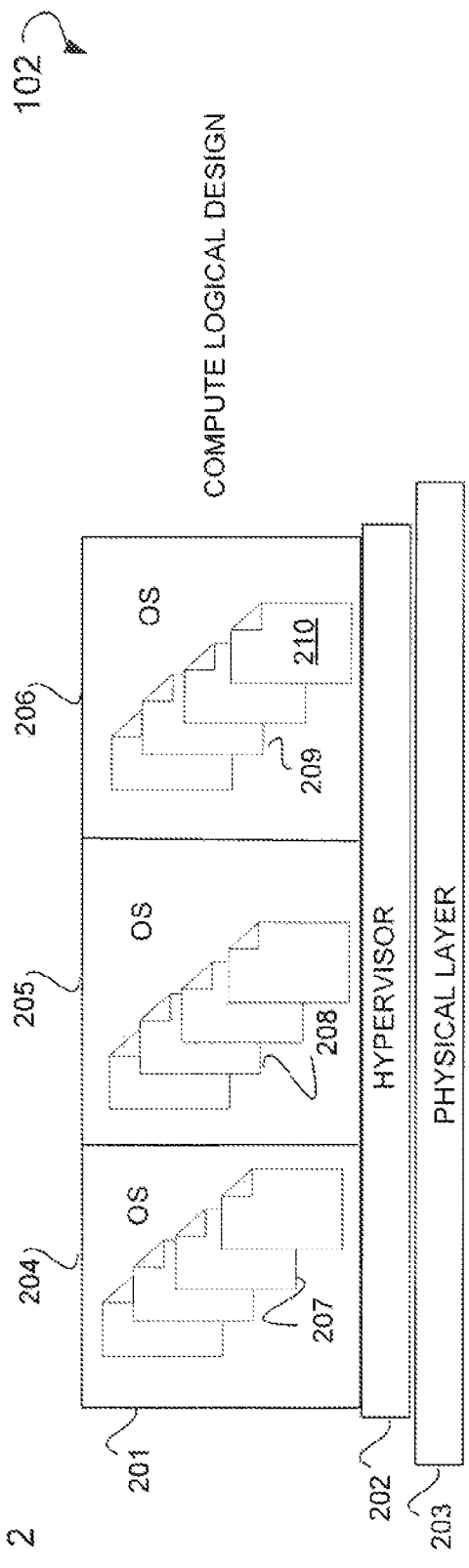
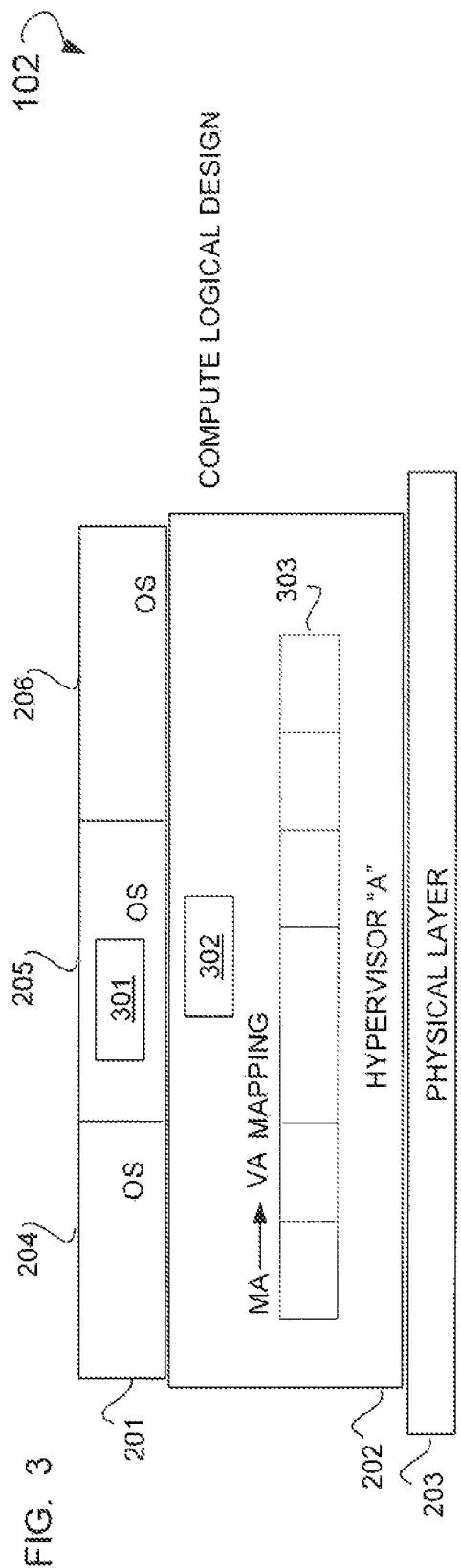

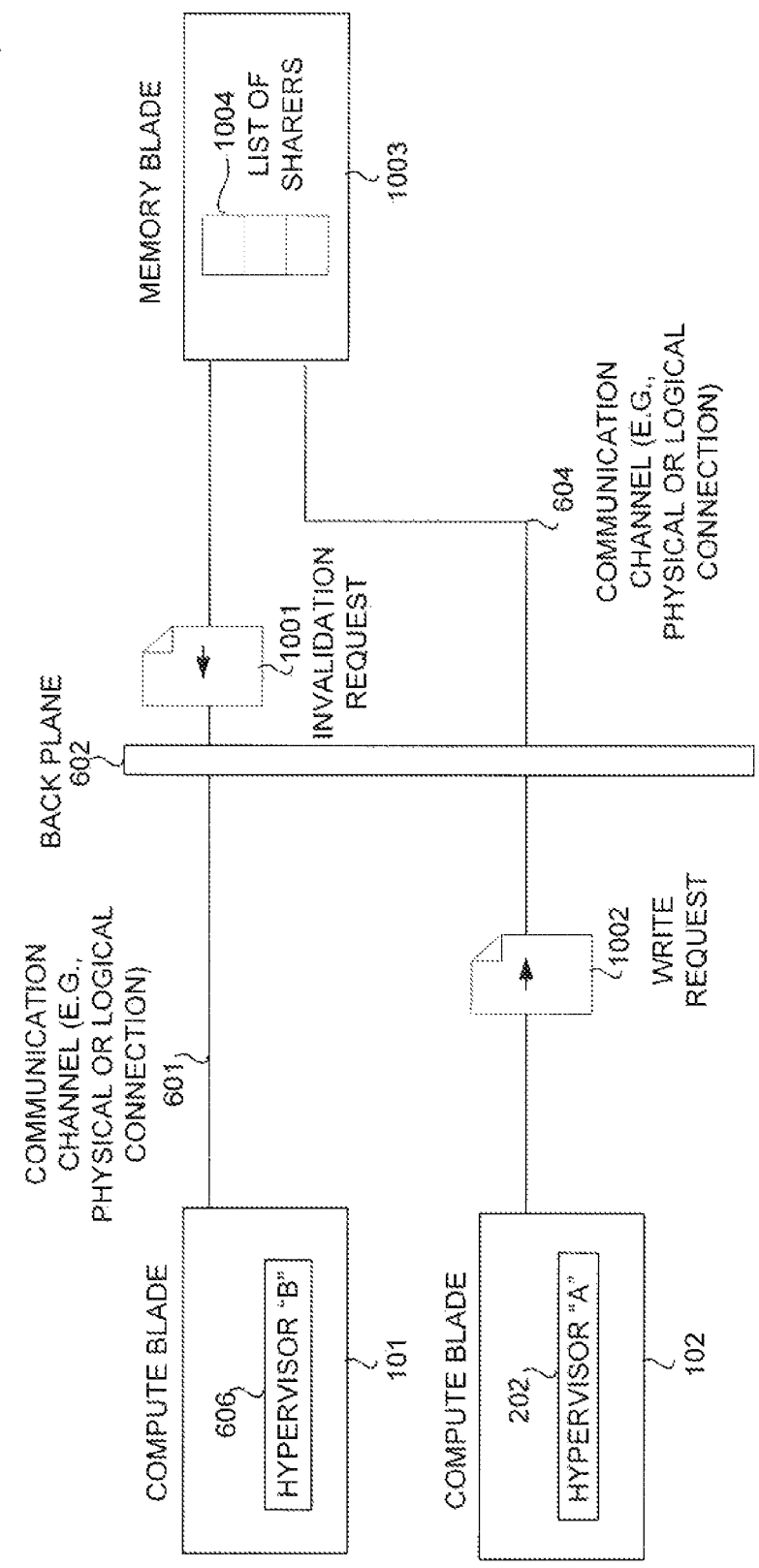

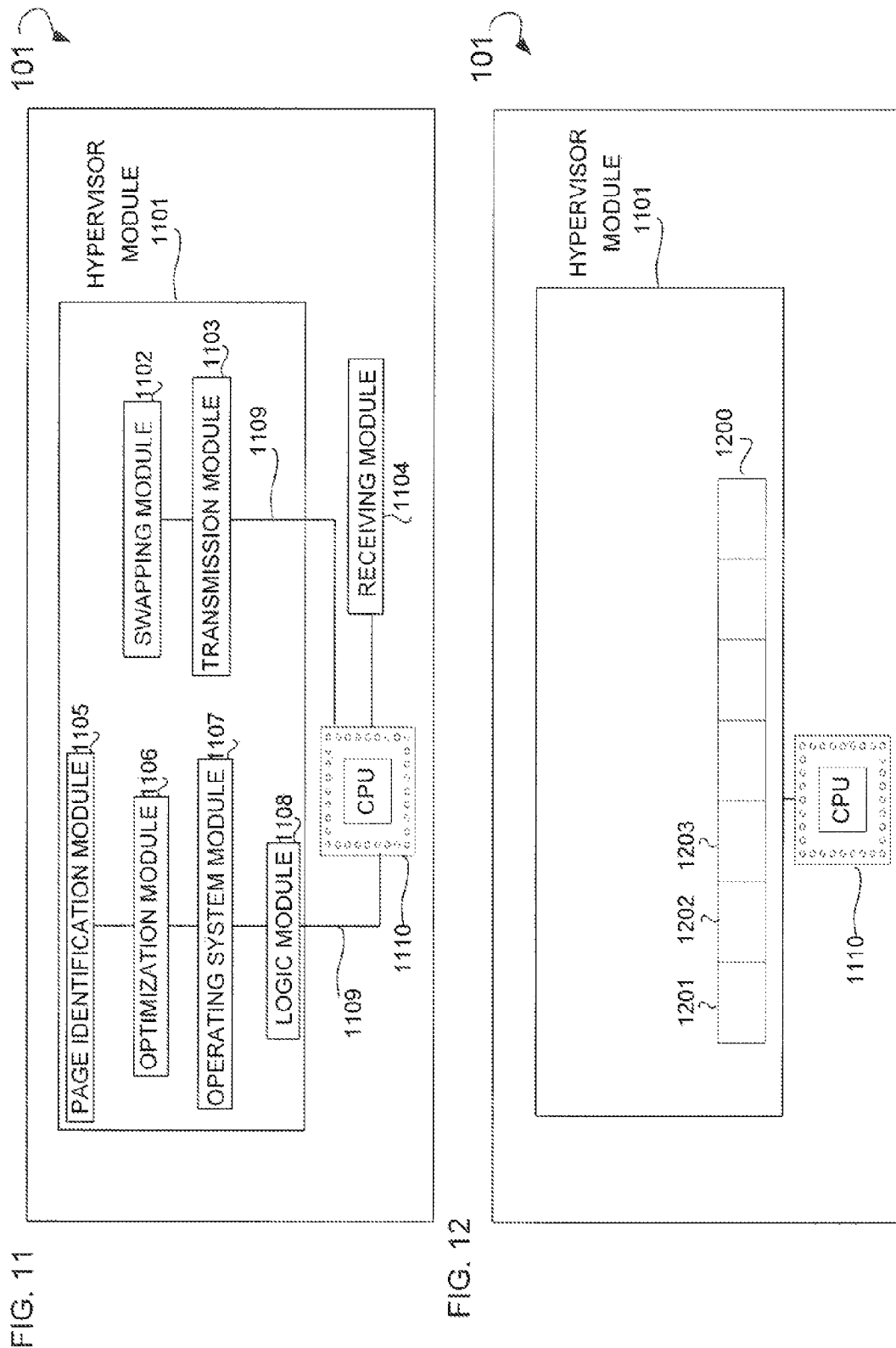

COMPARE A TARGET MEMORY SIZE AND A LOCAL MEMORY SIZE USING A HYPERVISOR MODULE THAT RESIDES UPON A COMPUTE BLADE, THE COMPARISON BASED UPON A UNIT OF DIGITAL INFORMATION FOR THE TARGET MEMORY SIZE AND AN ADDITIONAL UNIT OF DIGITAL INFORMATION FOR THE LOCAL MEMORY SIZE
1401

SWAP A LOCAL VIRTUAL MEMORY PAGE WITH A REMOTE VIRTUAL MEMORY PAGE USING A SWAPPING MODULE THAT RESIDES ON THE HYPERVISOR MODULE, THE SWAPPING BASED UPON THE COMPARING OF THE TARGET MEMORY SIZE AND THE LOCAL MEMORY SIZE
1402

TRANSMIT THE LOCAL VIRTUAL MEMORY PAGE TO A MEMORY BLADE USING A TRANSMISSION MODULE THAT RESIDES UPON THE COMPUTE BLADE
1403

RECEIVE THE REMOTE VIRTUAL MEMORY PAGE FROM THE MEMORY BLADE, USING A RECEIVING MODULE THE RESIDES ON THE COMPUTE BLADE
1404

SWAP THE REMOTE VIRTUAL MEMORY PAGE WITH A TEMPORARY LOCAL VIRTUAL MEMORY PAGE USING THE SWAPPING MODULE THAT RESIDES ON THE HYPERVISOR MODULE, THE SWAPPING BASED UPON THE COMPARING OF THE TARGET MEMORY SIZE AND THE LOCAL MEMORY SIZE
1405

IDENTIFY THE REMOTE VIRTUAL MEMORY PAGE AS A SUPER PAGE USING A PAGE IDENTIFICATION MODULE RESIDING ON THE HYPERVISOR MODULE
1406

PROCESS A PORTION OF THE SUPER PAGE USING AN OPTIMIZATION MODULE RESIDING ON THE HYPERVISOR MODULE
1407

EXECUTE AN APPLICATION MANAGED BY AN OPERATING SYSTEM MANAGED BY THE HYPERVISOR MODULE, THE EXECUTION INCLUDING PROCESSING THE PORTION OF THE SUPER PAGE AS AN INSTRUCTION SET FOR THE APPLICATION
1408

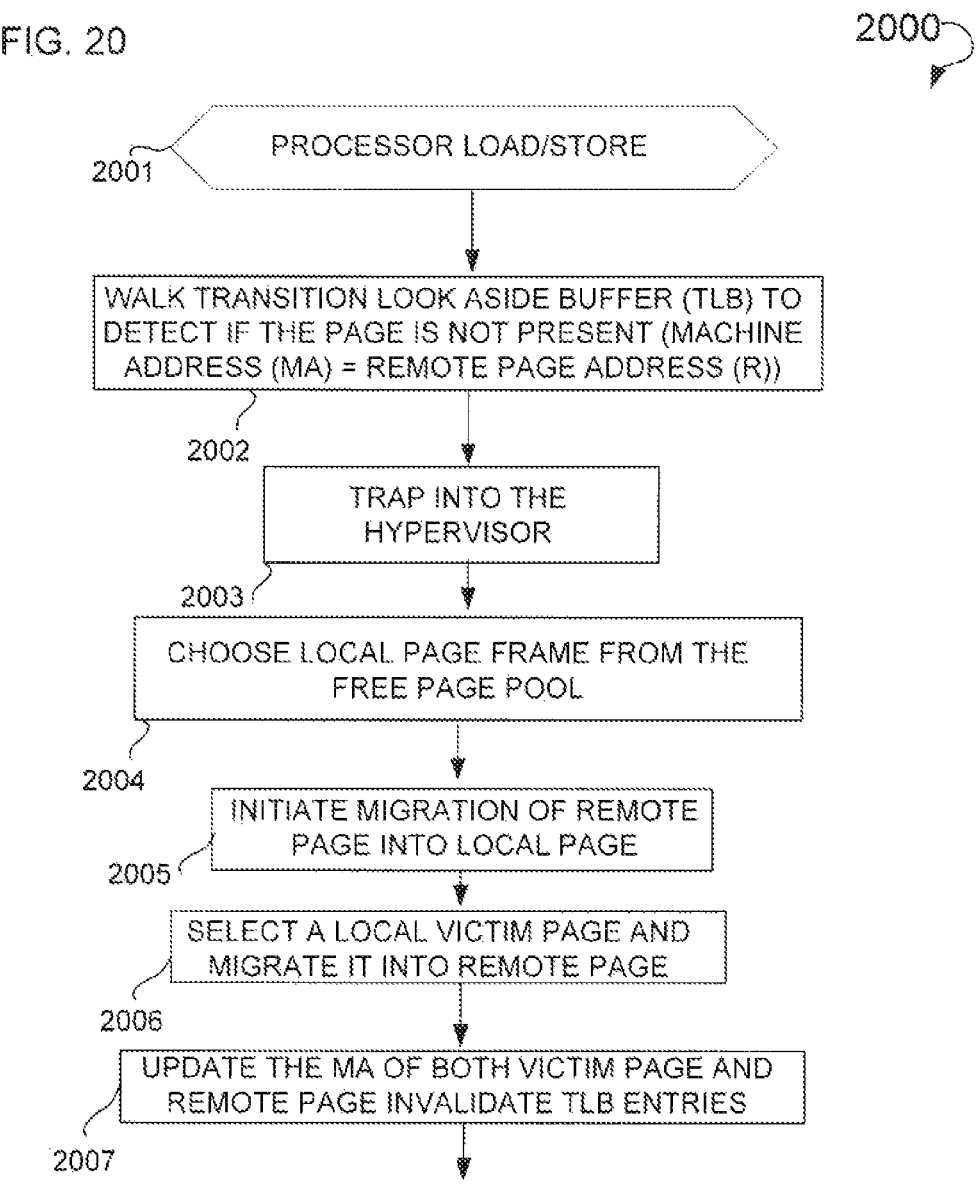

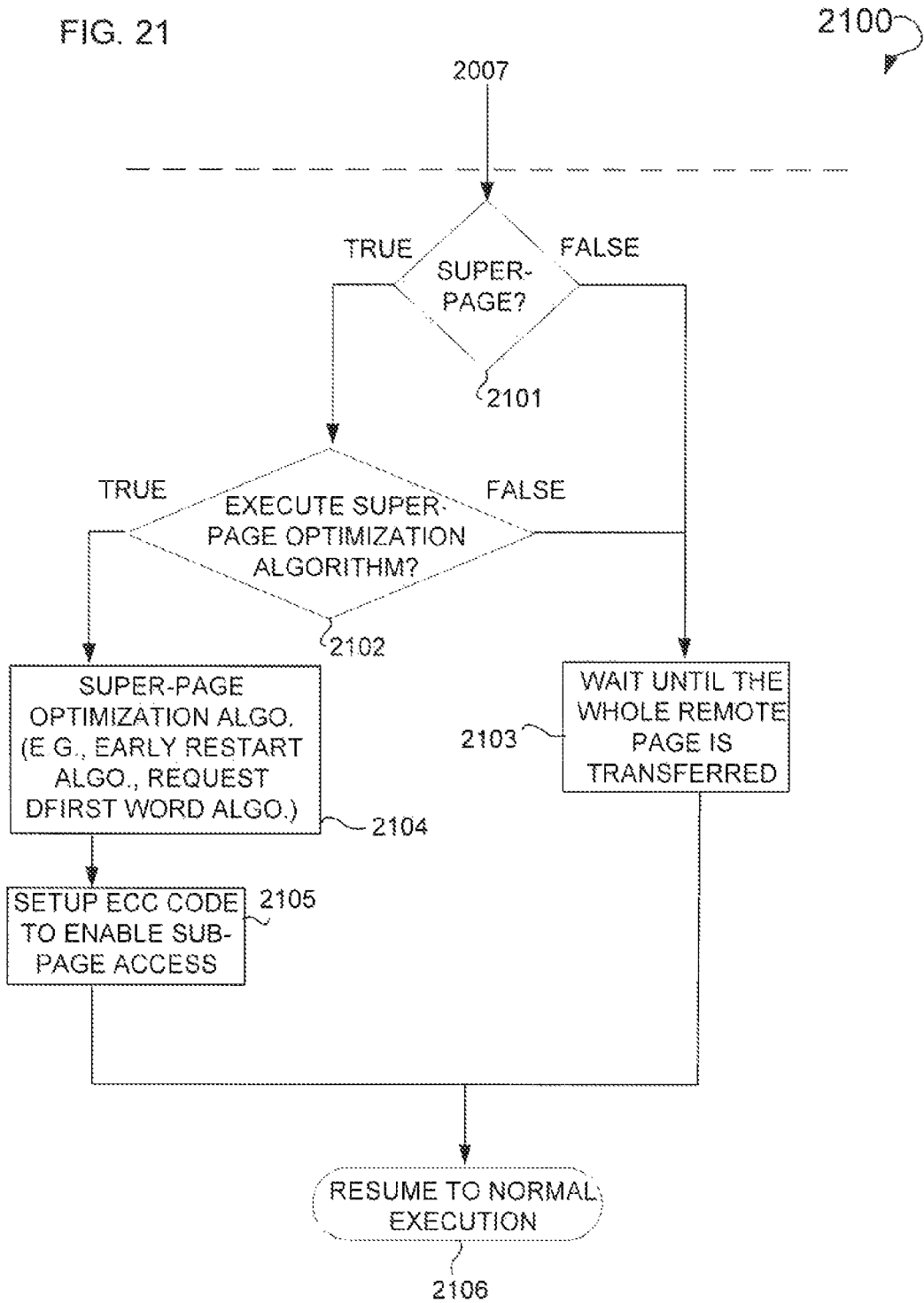

FIG. 22                                                           303

| 2201 MACHINE ADDRESS (MA) INDEXING VALUE | | 2202 VIRTUAL PARAMETERS <VM, PID, VA> |
|---|---|---|
| | E2344 | F45A12, 3433, DE411 |
| | E2345 | 145A12, ED21, FF976 |
| | E2346 | 147A12, 3451, AA1245 |
| | E2347 | 177A12, F123, 124F4 |
| | E2348 | 199A12, 342A, 66741 |
| | E2349 | 211A12, 986A, 99564C |
| | E2350 | 203A12, 678A, 45633A |
| | E2351 | 222A12, E231, 4442F |

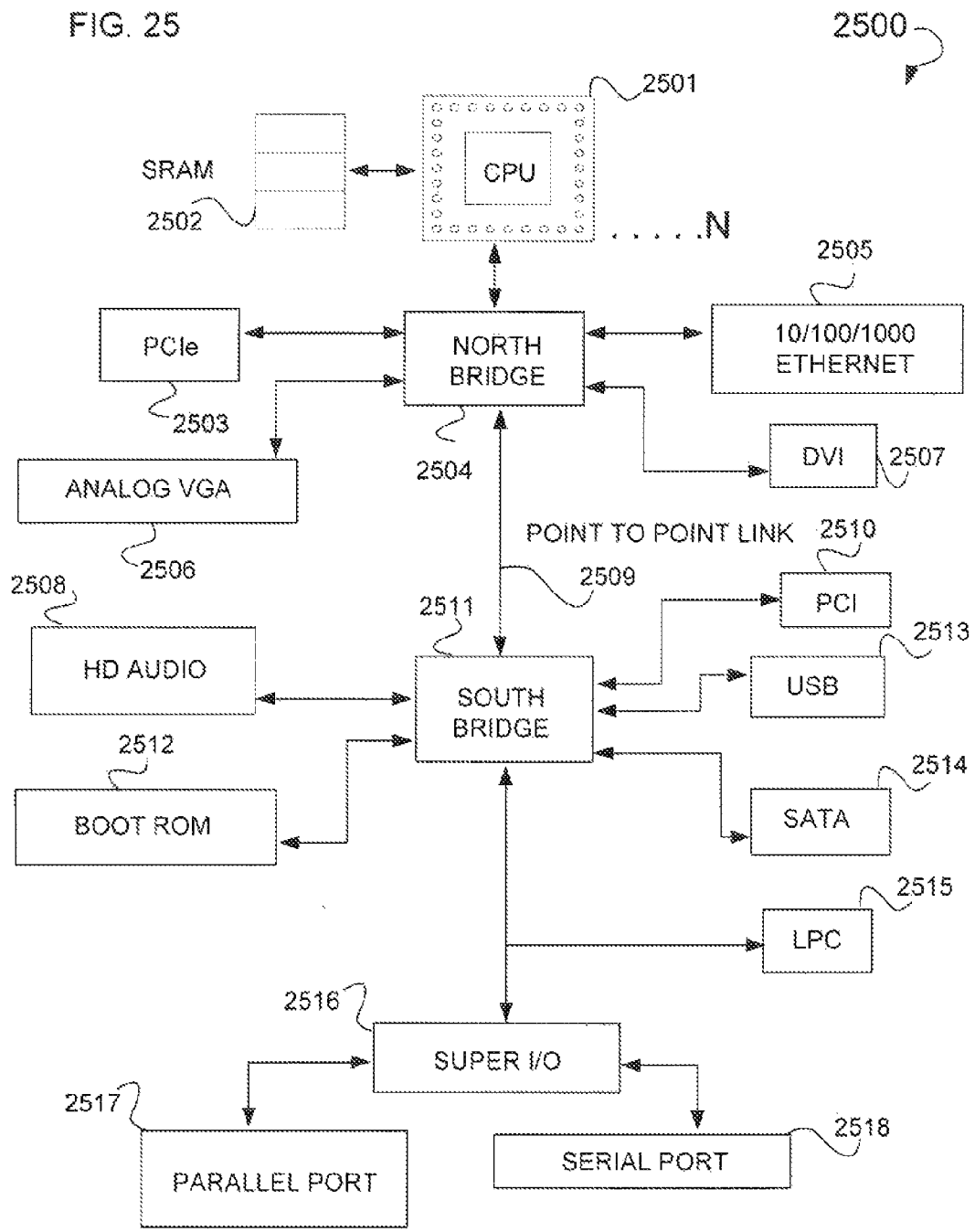

HYPERVISOR-BASED MANAGEMENT OF LOCAL AND REMOTE VIRTUAL MEMORY PAGES

CROSS REFERENCE TO RELATED APPLICATIONS

This is non-provisional patent application related to Patent Cooperation Treaty Application Number PCT/US2008/069168 entitled "MEMORY SERVER" that was filed on Jul. 3, 2008, and which is incorporated by reference in its entirety.

BACKGROUND

Multi-core based computing may be used to solve a number of data intensive problems. Computers with multiple cores can be implemented as compute blades in a blade rack, a plurality of computers organized as one or more computing clusters, or some other suitable organization. These computers with multiple cores can be used within a data center, server farm, or some other suitable facility.

BRIEF DESCRIPTION OF THE DRAWINGS

Some embodiments of the invention are described, by way of example, with respect to the following figures:

FIG. 1 is a diagram of a system, according to an example embodiment, illustrating virtual page swapping based memory disaggregation using a hypervisor-based implementation of a compute blade.

FIG. 2 is a diagram illustrating a logical design, according to an example embodiment, of a compute blade.

FIG. 3 is a diagram illustrating the logical design of the compute blade, according to an example embodiment, that implements balloon drivers, a management agent, and data structure associated with a hypervisor.

FIG. 10 is a diagram of a system, according to an example embodiment, for ensuring cache coherence when sharing data across compute blades.

FIG. 11 is a block diagram of a computer system, according to an example embodiment, in the form of the compute blade used to swap memory pages.

FIG. 12 is a diagram of a data structure, according to an example embodiment, that resides on a computer readable medium for mapping a Machine Address (MA) to one or more virtual parameters.

FIG. 14 is a diagram of a computer implemented method, according to an example embodiment, executed to swap virtual memory pages.

FIG. 20 is a flowchart illustrating the execution of a method, according to an example embodiment, used to migrate local and remote memory.

FIG. 21 is a flowchart illustrating an execution of a method, according to an example embodiment, that shows additional operations that are included as a part of the method illustrated in FIG. 20.

FIG. 22 is a diagram of a data structure, according to an example embodiment, used to map machine addresses to one or more virtual parameters.

FIG. 25 shows a diagrammatic representation of a machine in the example form of a computer system within which a set of instructions for causing the machine to perform any one or more of the methodologies discussed herein may be executed.

DETAILED DESCRIPTION

Figure 4:
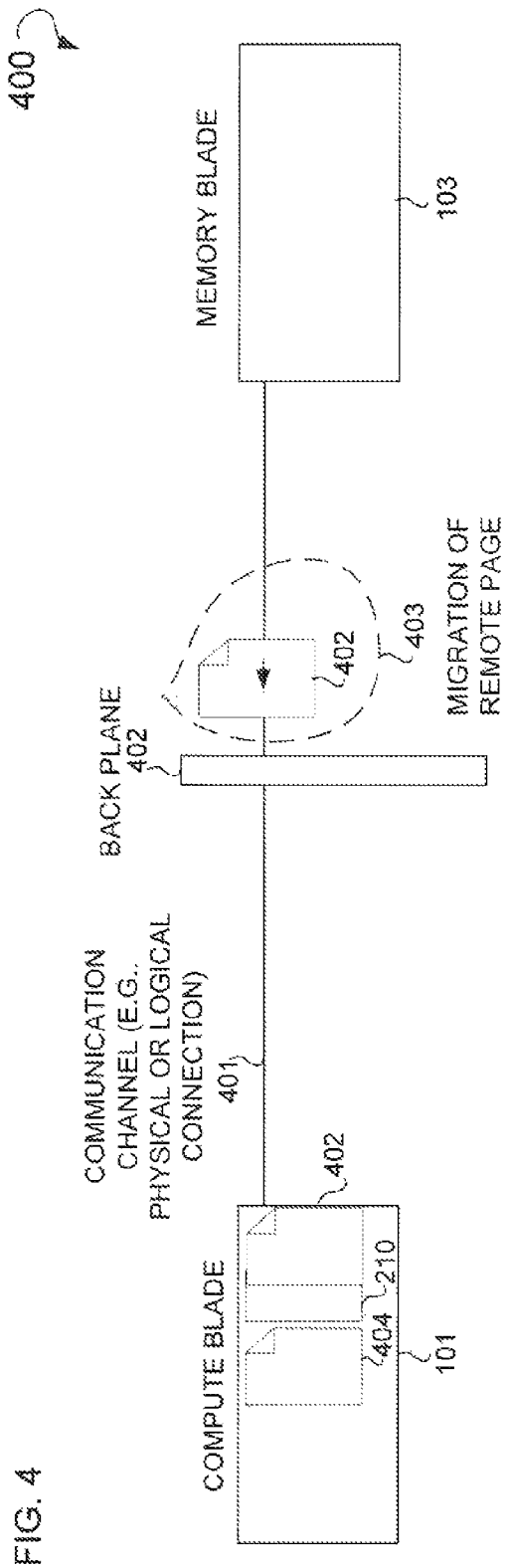
FIG. 4 is a diagram of a system, according to an example embodiment illustrating the migration of a remote memory page.

Illustrated is a system and method for virtual page swapping based memory disaggregation using a hypervisor-based implementation of a compute blade. A virtual page is a fixed-length block of memory that is contiguous in both physical memory addressing and virtual memory addressing. This memory may be Static Random Access Memory (SRAM), Dynamic Random Access Memory (DRAM), or other Main Memory implementation (e.g., optically, magnetically or flash based memory). A hypervisor or Virtual Machine Monitor (VMM) is a computer hardware virtualization software that allows multiple operating systems (OSs) to run on a host computer concurrently. These multiple operating systems, also referred to herein as Virtual Machines (VMs), may be implemented using any one of a number of virtualization schemes. These schemes include Full Virtualization, Partial Virtualization, Paravirtualization, Hardware-Assisted Virtualization, and Operating System-Level Virtualization. A computer blade, as referenced herein, is a computer system with memory to read input commands and data, and a processor to perform commands manipulating that data. In some example embodiments, the compute blade also includes a backing storage (e.g., the above referenced memory) to store the results. This backing storage may be located native to the compute blade, or remote to the compute blade in a memory blade.

In one example embodiment, virtual memory is migrated or swapped between a compute blade and a memory blade across a communication channel so as to remotely allocate virtual memory. In example cases where swapping occurs, a target memory address and a local memory size are compared to determine whether the target memory page is stored remotely on the memory blade, and thus needs to be swapped with a local virtual memory page. A target memory is a requisite virtual memory value that is met for the purpose of allowing a software application to function. A local memory size is a memory value denoting the amount of virtual memory natively available on a compute blade. A local virtual memory page is a page of virtual memory that is native to a particular compute blade. A remote virtual memory page is page of virtual memory that is remotely located. In some example embodiments, swapping is facilitated through the use of a temporary local virtual memory page. A temporary local virtual memory page is a virtual memory page that is free or otherwise allocated only for the purpose of swapping a local and remote virtual memory page.

In one example embodiment, a hypervisor based data structure is implemented that allows for MA based indexing of the data structure. This data structure may include virtual parameters that include a VMID, a process ID within the VM, and a Virtual Address (VA). A MA is a numeric value representing a particular physical memory location in the compute blade. A VMID is a numeric value representing a virtual machine residing on a compute blade and managed by a hypervisor. A process ID is a numeric value representing a process or application program residing in a VM. A VA is a numeric value used to reference a memory location in virtual memory address space which is commonly used by a process in a VM. The combination of the VMID, process ID and VA provides information to locate a virtual page that corresponds to the MA.

In some example embodiments, swapping as under herein is triggered by detection of a remote virtual memory page access that includes an address comparison to detect the remote virtual memory page; and includes a copying of the remote page into local buffer; a selection and eviction of a local page; and page table updates that includes MA to VA mapping. This swapping is more fully illustrated below.

In one example embodiment, a balloon based memory allocation technique is utilized to facilitate remote memory allocation. This technique may utilize memory balloon drivers or agents, where a memory balloon driver or agent allocates memory within a particular operating system or VM. The balloon driver or agent receives instructions, for example, a balloon command, from a hypervisor.

FIG. 1 is a diagram of an example system 100 illustrating virtual page swapping based memory disaggregation using a hypervisor-based implementation of a compute blade. Shown are a compute blade 101, a compute blade 102, and a memory blade 103 each of which is positioned proximate to a blade rack 104. The compute blades 101-102 are operatively connected to the network 105 via a logical or physical connection. The network 105 may be an internet, an intranet, a Wide Area Network (WAN), a Local Area Network (LAN), or some other network and suitable topology associated with the network. In some example embodiments, operatively connected to the network 105 is a plurality of devices including a cell phone 106, a Personal Digital Assistant (PDA) 107, a computer system 108 and a television or monitor 109. In some example embodiments, the compute blades 101-102 communicate with the plurality of devices via the network 105.

FIG. 2 is a diagram illustrating an example logical design of the compute blade 102. Shown is a logical design of the compute blade 102, and the various logical layers associated therewith. Illustrated is an operating system layer 201 that resides upon a hypervisor 202, which, in turn, resides upon a physical layer 203. The operating system layer 201 includes one or more operating systems acting as VMs. Suitable operating systems include for example the LINUX™ operating system, Microsoft Corporation's WINDOWS™ operating system, Sun Corporation's SOLARIS™ operating system, the UNIX™ operating system, or some other suitable operating system known in the art. The hypervisor 202 may be configured as a para-virtualized, fully-virtualized, or other types of hypervisor. The physical layer may be a computer system. In some example embodiments, the operating system layer 201 includes operating systems 204-206. Included as part of the operating system 204 is a page frame 207 that corresponds to one or more pages of virtual memory. Similarly, the operating system 205 includes a page frame 208 that comprises one or more pages of virtual memory. Additionally, the operating system 206 includes a page frame 209 that, in turn, includes a virtual memory page 210. The virtual memory pages may be of a suitable size including 2 KB, 4 KB, or 16 KB.

FIG. 3 is a diagram illustrating an example logical design of the compute blade 102 that implements balloon drivers, a management agent, and data structure associated with the hypervisor 202. Shown is the operating system layer 201 that includes the operating system 205. A balloon driver 301 is included as part of this operating system 205. In some example embodiments, the balloon driver 301 is used to allocate and de-allocate virtual memory in the operating system. This allocation and de-allocation is performed transparently for the operating system 205 by the balloon driver 301 working in conjunction with the hypervisor 202. Further, illustrated is a management agent 302 that collaborates with the hypervisor 202 to solicit additional memory from the memory blade 103. In some example embodiment, the management agent 302 may be implemented as hardware natively located on the compute blade 102, whereas in other embodiments the management agent 302 may be used to provision the blade rack 104 as a separate device located proximate to the blade rack 104. Additionally shown, is a data structure 303 that maintains MA to VA mapping for the hypervisor 202. This data structure 303 is more fully illustrated below in FIGS. 12 and 22.

FIG. 4 is a diagram of an example system 400 illustrating the migration of a remote memory page. Illustrated is the compute blade 101 operatively coupled to the memory blade 103 via a communication channel 401. The communication channel 401 may be a logical or physical connection. Further, in some example embodiments, communication channel 401 passes through a backplane 402. The memory blade 103 transmits virtual memory page 402 across the communication channel 401 to the compute blade 101 as part of the migration of the virtual memory page 402 referenced herein at 403. The virtual memory page 402 is used to overwrite a victim page selected by the hypervisor residing on the computer blade 101. Here, for example, virtual memory page 210, a local memory page, has been selected as a victim page. In some example embodiments, a temporary page, such as virtual memory page 404 is use to store the data of the victim page (e.g., virtual memory page 210).

Figure 5:
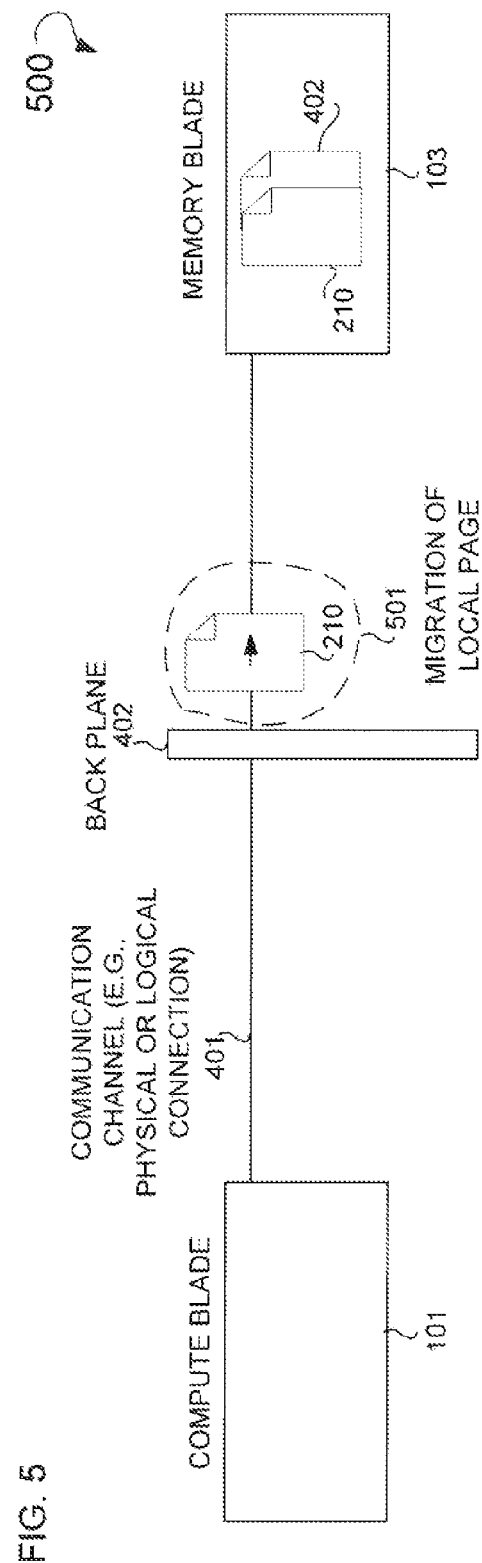
FIG. 5 is a diagram of a system, according to an example embodiment, illustrating the migration of a local memory page.

FIG. 5 is a diagram of example system 500 illustrating the migration of a local memory page. Shown is the compute blade 101 that is operatively coupled to the memory blade 103 via the communication channel 401. Illustrated is the migration of the local virtual memory page 210 represented at 501. The virtual memory page 210 is transmitted across the communication channel 401 and received by the memory blade 103. This virtual memory page 210 is used to over-write, for example, the previously remotely located virtual memory page 402. In some other example embodiments, some other remotely located memory page may be selected to be overwritten.

Figure 6:
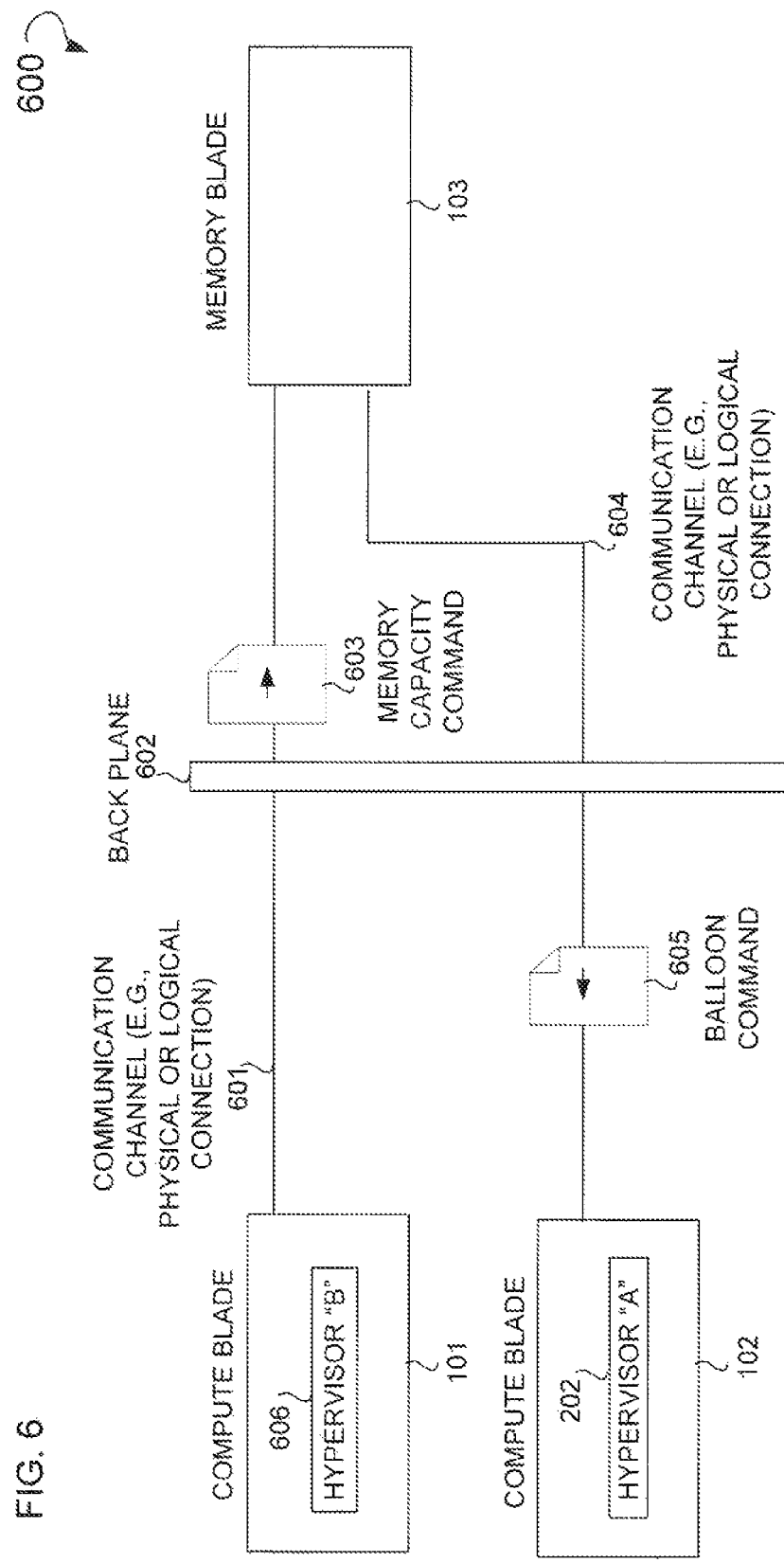
FIG. 6 is a diagram of a system, according to an example embodiment, used to implement a balloon based memory allocation technique to facilitate remote memory allocation.

FIG. 6 is a diagram of example system 600 used to implement a balloon based memory allocation technique to facilitate remote memory allocation. Shown are the compute blade 101, the compute blade 102, and the memory blade 103. The compute blade 101 is operatively coupled to the memory blade 103 via a communication channel 601. Further, the memory blade 103 is operatively connected to the compute blade 102 via a communication channel 604. Communication channel 601 and 604 may be a logical or physical connection. Additionally, residing upon the compute blade 101 is a hypervisor 606 referenced as "Hypervisor B". Further, residing upon the compute blade 102 is the previously referenced hypervisor 202 referenced as "hypervisor A". Illustrated is a memory capacity command 603 transmitted by the compute blade 101 across the communication channel 601, and received by the memory blade 103. As illustrated, the memory blade 101 is acting as a requesting memory blade. This memory capacity command 603 may be formatted using a protocol including Peripheral Component Interconnect Express (PCIe), or some other suitable protocol. The memory blade 103 generates and transmits a balloon command 605 across the communication channel 604. The balloon command 605 instructs the hypervisor 202, and management agent residing thereon, to allocate memory for an operating system managed by the hypervisor. In some example embodiments, the balloon command 605 instructs the hypervisor 202 to reclaim, or otherwise de-allocate memory.

Figure 7:
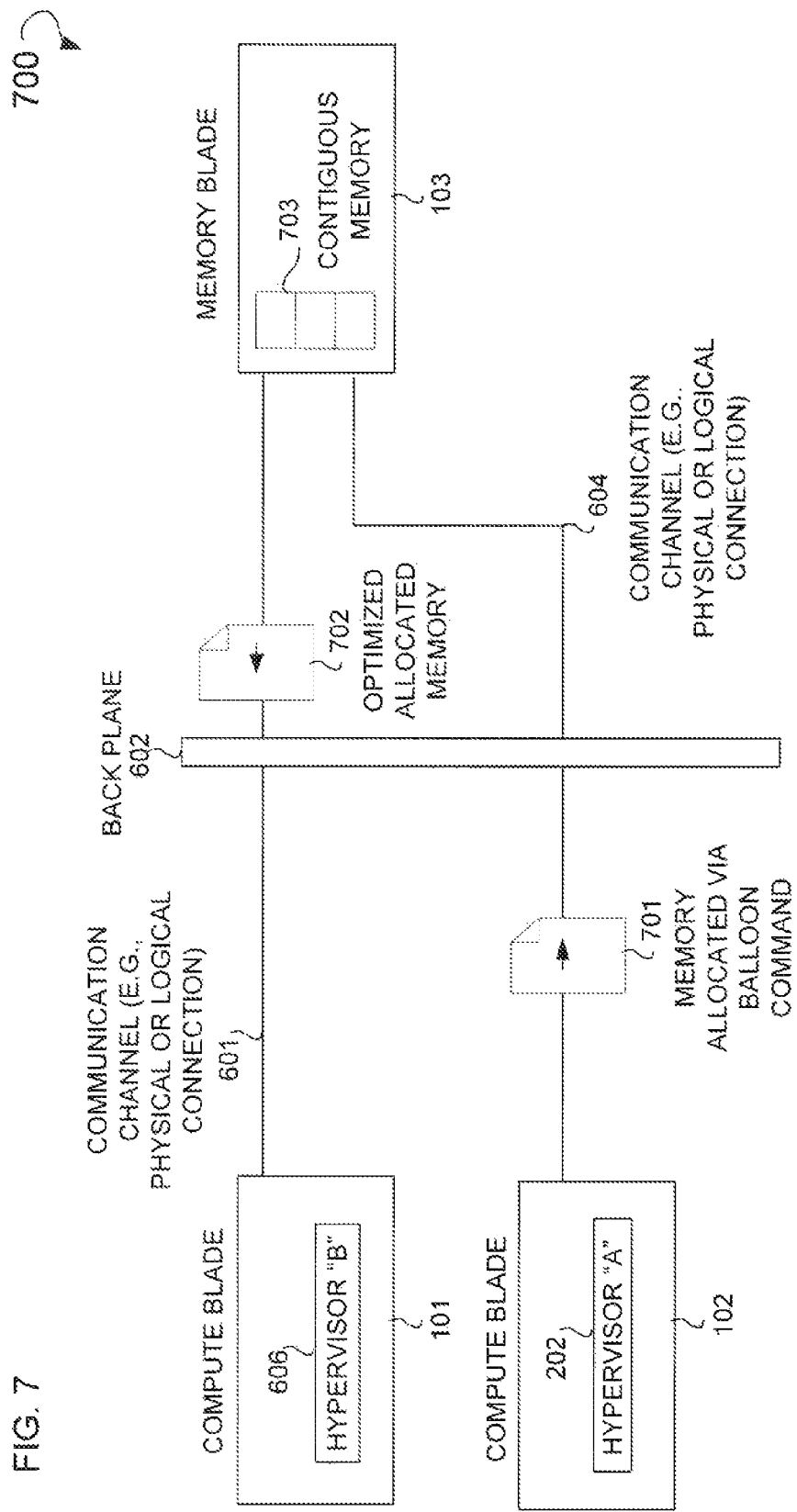
FIG. 7 is a diagram of a system, according to an example embodiment, illustrating the packing of allocated memory for the purposes of providing additional virtual memory to a requesting memory blade.

FIG. 7 is a diagram of example system 700 illustrating the packing of allocated memory for the purposes of providing additional virtual memory to a requesting memory blade. Packing, as used herein, may include compaction. Illustrated is allocated memory 701 that is allocated as a response to, for example, the balloon command 605. Included in, for example, the allocated memory 701 is a reference or pointer to physical memory residing upon the memory blade 103. In some example embodiments, a plurality of pointers or references may packed together to form a contiguous piece of memory, or may be organized into a data structure such as a hash table, contiguous array, tree, or other suitable data structure. In some example embodiments, the packing is performed by the hypervisor 202, or by the memory blade 103. As shown is a reference or pointer to optimized allocated memory 702 that is transmitted across the communication channel 701 by the memory blade 103. This reference or pointer to optimized allocated memory 702 may be used to access the above described hash table, contiguous array, tree, or other suitable data structure. The reference or pointer to the optimized allocated memory 702 is received by the compute blade 101.

Figure 8:
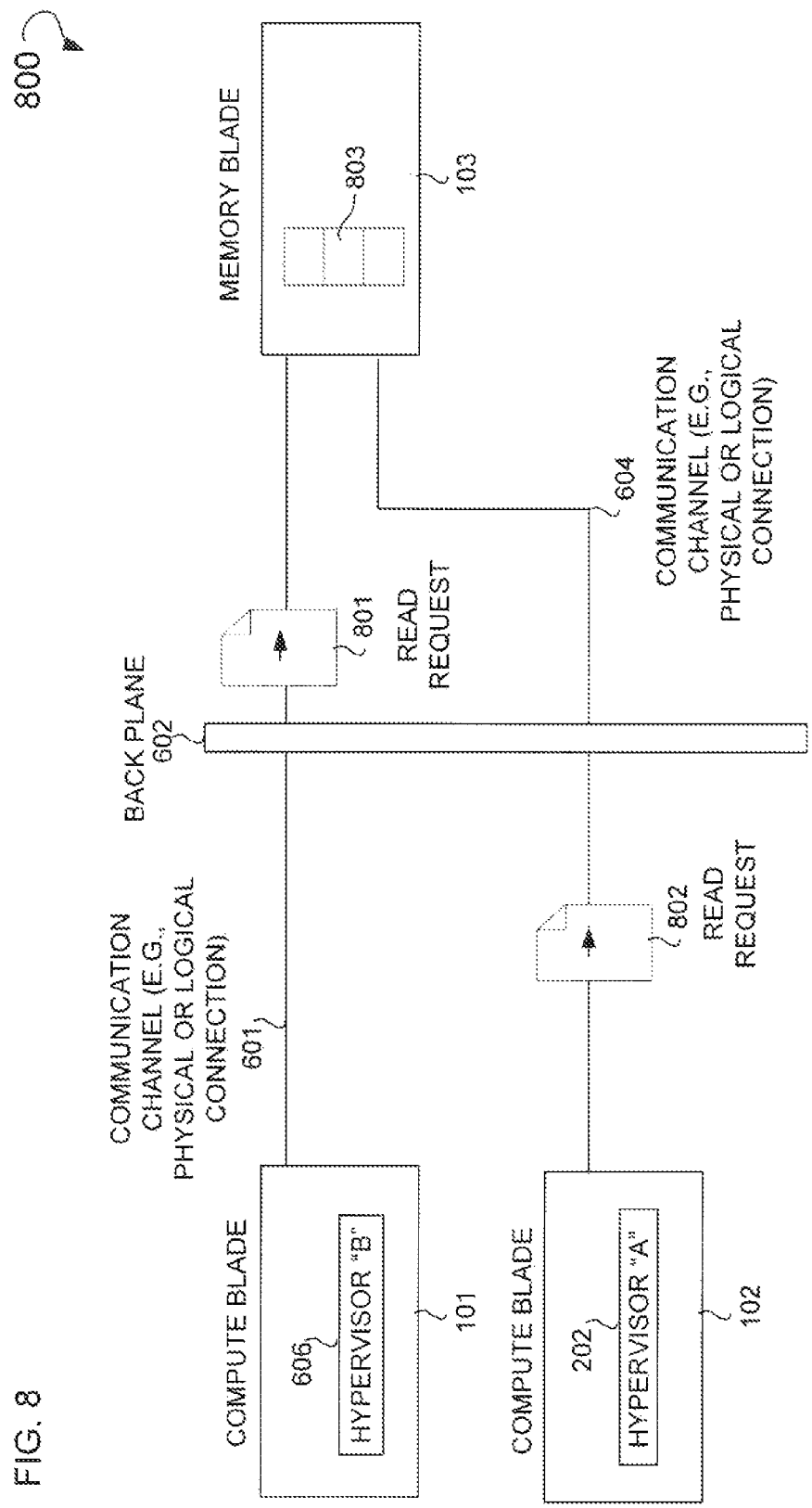
FIG. 8 is a diagram of a system, according to an example embodiment, for page-based non-swap usage of a memory blade by a plurality of hypervisors.

FIG. 8 is a diagram of an example system 800 for page-based non-swap usage of a memory blade by a plurality of hypervisors. Illustrated are the hypervisor 202 and 606 and generate read requests 801 and 802 respectively as part of a file interface usage. These read requests seek to access and read the memory location 803. This memory location 803 may be represented as a virtual memory page in the form of a regular page as part of a superpage. A superpage, as used herein, may be a 16 MB chunk of contiguous memory sub divided into 4 KB page frames. Included in this superpage is a "non-swap" bit attribute (e.g., a flag) to indicate that this superpage is shared across compute blades and cannot be swapped between a compute blade and the memory blade. This bit can be set by the memory blade 103 when the superpage is part of an in-memory file, or by the compute blades 101 or 102 when one of the compute blades creates data that is to be shared with other blades.

With respect to the system outlined in FIG. 8, an example method is disclosed wherein compute blade 102 requests for a part of a superpage from the memory blade 103. This request (e.g., the read request 801) includes a "non-swap" flag. The non-swap bit is matched with the non-swap flag to enforce this non-swapping, read only policy. These bits on the memory blade 103 may be stored in a bit-vector. In some example embodiments, the hypervisor 202 can cache virtual memory pages that are flagged "non-swap" (e.g., referenced herein as "non-swap pages") locally in a portion of reserved memory that are not visible to any of the virtual machines. This cache can be organized similar to an operating system caches, reducing the number of accesses to the memory blade. Because the non-swap pages can be cached in multiple compute blade hypervisor caches, cache coherency may be maintained between these cached copies (see FIG. 10 below).

Figure 9:
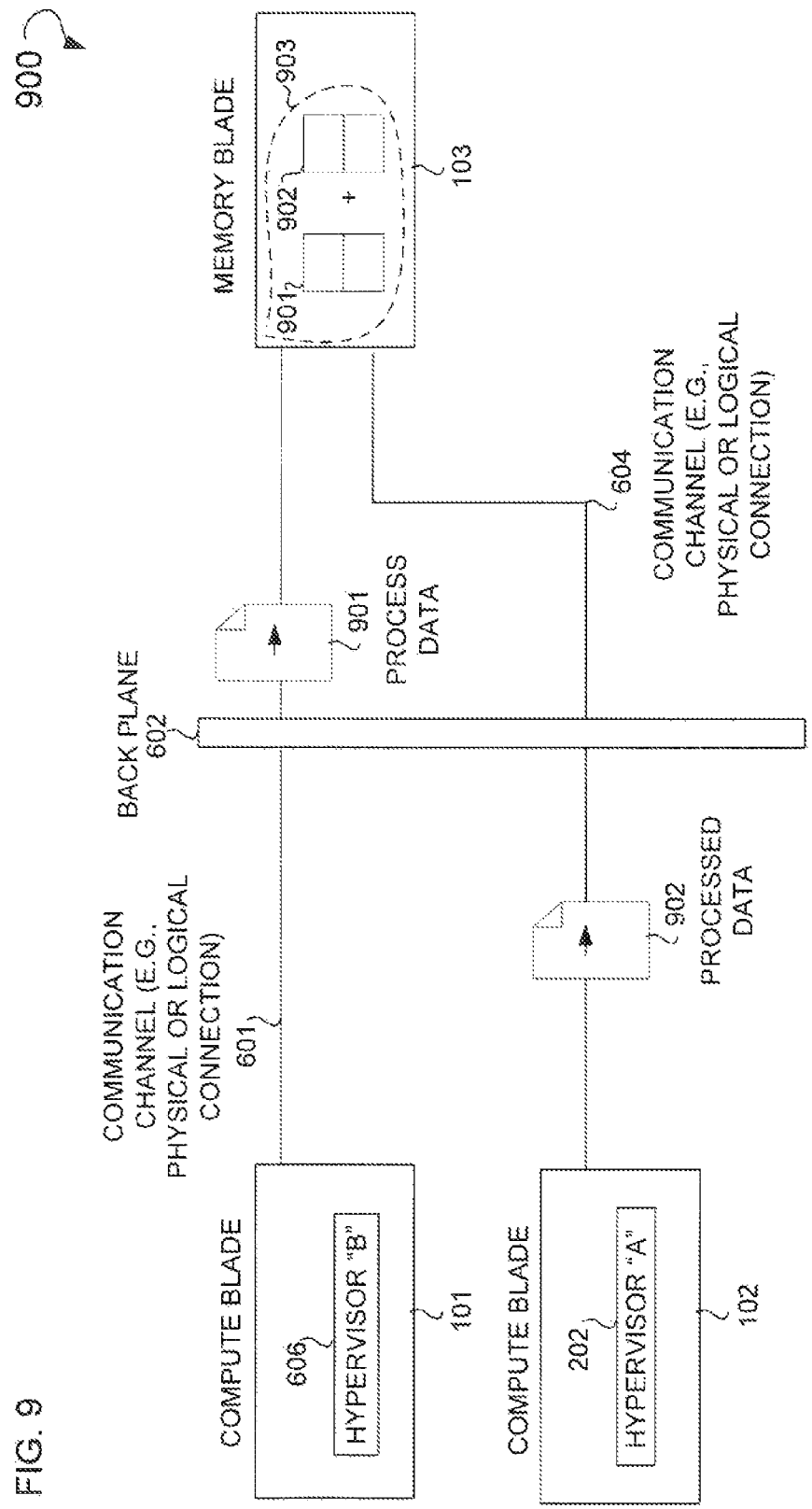
FIG. 9 is a diagram of a system, according to an example embodiment, for supporting file semantics on a memory blade.

FIG. 9 is a diagram of an example system 900 for supporting file semantics on a memory blade. Illustrated are processed data 901 and processed data 902 that are processed by the compute blade 101 and 102 respectively. Processed data 901 and 902 may be portions of a larger set of data that is sub-divided for processing by the memory blades 101 and 102. In some example embodiments, the processed data 901 and 902 may be a referent to data residing on the memory blade 103, wherein the processed data is accessed via the referent. A referent, as used herein, is a pointer to an address in memory of the memory blade 103. The data residing on the memory blade may be accessed through the use of pointer arithmetic of other suitable method to manipulate data in memory. As shown, the processed data 901 and 902 is combined through the memory blade 103 applying some type of logical operation to the processed data 901 and the processed data 902. This logical operation includes, for example, a concatenation operation, join operation, set difference operation, of some other suitable type of logical operation. The application of this logical operation is illustrated at 903.

With respect to the system outlined in FIG. 9, an example method is disclosed wherein to provide a simple file abstraction, the memory blade 103 adds (e.g., applies a logic operation) two data structures (e.g., either stored in reserved DRAM) on the memory blade 103. This method may also be applied to two data structures referenced within the address map hardware tables as part of the memory controller hardware. The first data structure is a list of file IDs, with their corresponding file names, size (e.g., in terms of total number of superpages), and each with a pointer to the sequence of superpages that consisting the file content. This is used to create/delete/open/close files on the memory blade. The second data structure maps the file ID to its sequence of superpages. When multiple compute blades (e.g., 101 and 102) load a distributed file into the memory blade 103, each can load a segment stored in its local disk as indicated by the offset within the file. The compute blade requests a new superpage to hold this segment, and the memory blade 103 allocates a free superpage from its freelist, set its "non-swap" bit, and update this file's superpage sequence using this new address. The compute blade can perform a Direct Memory Access (DMA) transfer of the segment into the memory blade 103 (e.g., with its file ID and offset). Any compute blade that connects to the memory blade can subsequently open the file (e.g., which returns a file ID based on the requested file name), and access any portion of the file using (e.g., the file ID, the offset). A compute blade can also employ conventional file caching techniques to reduce memory blade accesses and support mmap( )-like interface to manipulate the file content.

FIG. 10 is a diagram of an example system 1000 for ensuring cache coherence when sharing data across compute blades. Shown are an invalidation request 1001 and a write request 1002. The invalidation request 1001 is transmitted to the compute blade 101 that maintains a previous copy of data (e.g., virtual memory page) that is to be re-written by the compute blade 102 via the write request 1002. A list of shares 1004 is used by the memory blade 103 to track compute blades with previous copies of data (see e.g., compute blade 101). For example, when a compute blade becomes a writer, the compute blade 102 needs to ensure that the cached copies of previous reader/writers compute blades are invalidated. To facilitate this process, on the memory blade 103, each superpage now has file ID and file offset fields as its name in the in-memory file system. The superpage also maintains a list of sharers (e.g., a vector of compute blades) and the current writer blade. When a compute blade acquires the writer-ship of a superpage (e.g., compute blade 102), the memory blade 103 sends invalidation request to all previous sharers. The invalidation request includes the corresponding file ID and file offset. The memory blade 103 may wait until all sharer blades acknowledge the completion of file cache invalidation. In some example embodiments, when a compute blade access a superpage, the memory blade 103 also checks that the requesting compute blade is the writer to avoid data races at the superpage granularity.

In some embodiments, cache coherency is ensured to support the use of VM cloning, a type of non-swap usage. As disclosed herein, a method is provided that allows for a VM, and memory locations allocated for this VM, to be cloned onto a plurality of physical layers 203. In example embodiments, a reference page table and virtual memory pages associated with a VM are stored onto the memory blade 103. A boot process is initiated for a compute blade. As part of this boot process an operation is executed to retrieve the page table from the memory blade 103 for each instantiation of a VM on the compute blade. In some example embodiments, a plurality of compute blades are booted and the page table retrieved from the memory blade 103 for a plurality of VMs instantiated on each memory blade 103. The virtual memory pages referenced by the page table may be access via the methods outlined in FIGS. 8, 9, and 10. When a cloned virtual machine attempts to change a reference memory page, the hypervisor will invoke a Copy-On-Write (COW) operation, to allocate a new memory frame for store changed page.

FIG. 11 is a block diagram of an example computer system in the form of the compute blade 102 used to swap memory pages. These various blocks may be implemented in hardware, firmware, or software as part of the computer blade 101, or computer blade 102. Further, these various blocks are logically or physically connected, as referenced at 1109. Additionally, a CPU 1110 may be used to execute and manage the various modules referenced herein. Illustrated is a hypervisor module 1101 to compare a target memory address and a local memory size, the comparison based upon a unit of digital information for the target memory size and an additional unit of digital information for the local memory size. The hypervisor module 1101 may be the hypervisor 202. This unit of digital information may be a kilobyte (KB), megabyte (MB), gigabyte (GB), or some other suitable unit of measurement. Additionally, a swapping module 1102 is used to swap a local virtual memory page with a remote virtual memory page, the swapping based upon the comparing of the target memory address and the local memory size. Further, a transmission module 1103 is used to transmit the local virtual memory page to a memory blade. A receiving module 1104 is used to receive the remote virtual memory page from the memory blade 103. In some example embodiments, the comparison includes at least one of an equivalence comparison, a greater than comparison, or a less than comparison. Some example embodiments include the target memory address defined by an application executed on the compute blade. Additionally, the local memory size may be defined by an operating system managed by the hypervisor module, the operating system residing on the compute blade. Further, the swapping module 1102 is used to swap the remote virtual memory page with a temporary local virtual memory page using the swapping module that resides on the hypervisor module, the swapping based upon the comparing of the target memory size and the local memory size. Also shown is a page identification module 1105 that identifies the remote virtual memory page as a super page. This identification may be facilitated by analyzing the unit of digital information allocated for a virtual memory page. An optimization module 1106 is illustrated that processes a portion of the super page. An operating system module 1107 is executed to process the portion of the super page as an instruction set for the application. An example of the operating system module 1107 is the OS 205. An instruction set is a set of encoded instruction provided to instruct a CPU, where these instruction are written as a human readable code or binary values. In some example embodiments, a super page is a virtual memory page is virtual memory page in excess of 4 KB, 8 KB, 16 KB, or some other suitable size.

Some example embodiments include the compute blade comprising a logical architecture with at least one of a physical layer, a hypervisor layer, a virtual machine layer, or an application layer. Additionally, the memory blade includes a logical architecture with at least one of a protocol agent, a memory controller, address mapping, or accelerators. A protocol agent is an application that encodes and decode data packets sent between a memory blade and compute blade where the encoding and decoding uses some type of protocol. A memory controller is a device logic that interacts with memory modules and manages the capacity allocation and de-allocation of memory native to a memory blade. Address mapping is a data structure that maps various types of address such as VA to MA, or some other suitable mapping. An accelerator is an application that allows for data packets to be stored to physical memory, or for physical memory to be searched. A logic module 1108 is shown, that resides on a hypervisor, and the logic module 1108 assigns a local memory available value to a local memory allocated value, where the target memory size is less than (<) the local memory size available. A local memory available value is a numeric value denoting the amount of native memory available on a compute blade. A local memory allocated value is a numeric value denoting the amount of local memory allocated on a compute blade. Additionally, the logic module 1108 is executed to assign a target memory size to a local memory, where the target memory size is greater than (>) the local memory size available. Further, the logic module 1108 is executed to assign (=) the difference between the target memory size and the local memory size to the remote memory allocated using a logic module, where the sum of the remote memory available and the local memory allocated is greater than or equal to (>=) the target memory size. The logic module 1108 may be executed to assign the remote memory available to the remote memory allocated using a logic module, where the sum of the remote memory allocated and the local memory allocated is less than the target memory side. Further, the logic module 1108 is executed to assign assigning the difference between the target memory size and the local memory allocated, and remote memory allocated to balloon memory allocated.

FIG. 12 is a diagram of an example data structure 1200 that resides on a computer readable medium for mapping a MA to one or more virtual parameters. This data structure 1200 is accessed by a hypervisor module that manages at least one virtual machine. In some example embodiments, the data structure 1200 includes a first field 1201 that includes a first machine address data object referencing at least one virtual parameter data object, the referencing identifying a virtual memory page allocated for the at least one virtual machine. Data object as used herein includes, for example, a numeric address in memory, where this number may be an integer, float, or double. The data structure 1200 may also include a second field 1202 that including the at least one virtual parameter data object that includes at least one of a virtual machine address, a process ID, or a virtual address for the virtual memory page. Additionally, the data structure 1200 also includes a third field 1203 that including a second machine address data object assigned a reference to access the at least one virtual parameter data object when the virtual page is accessed by another virtual machine managed by the hypervisor module. In some example embodiments, the first and second machine address data object is generated from a memory address using a technique including at least one of modulo arithmetic, or bit shifting. Additionally, in some example embodiments, the reference includes at least one of a memory location, or an adjacent memory cell.

Figure 13:
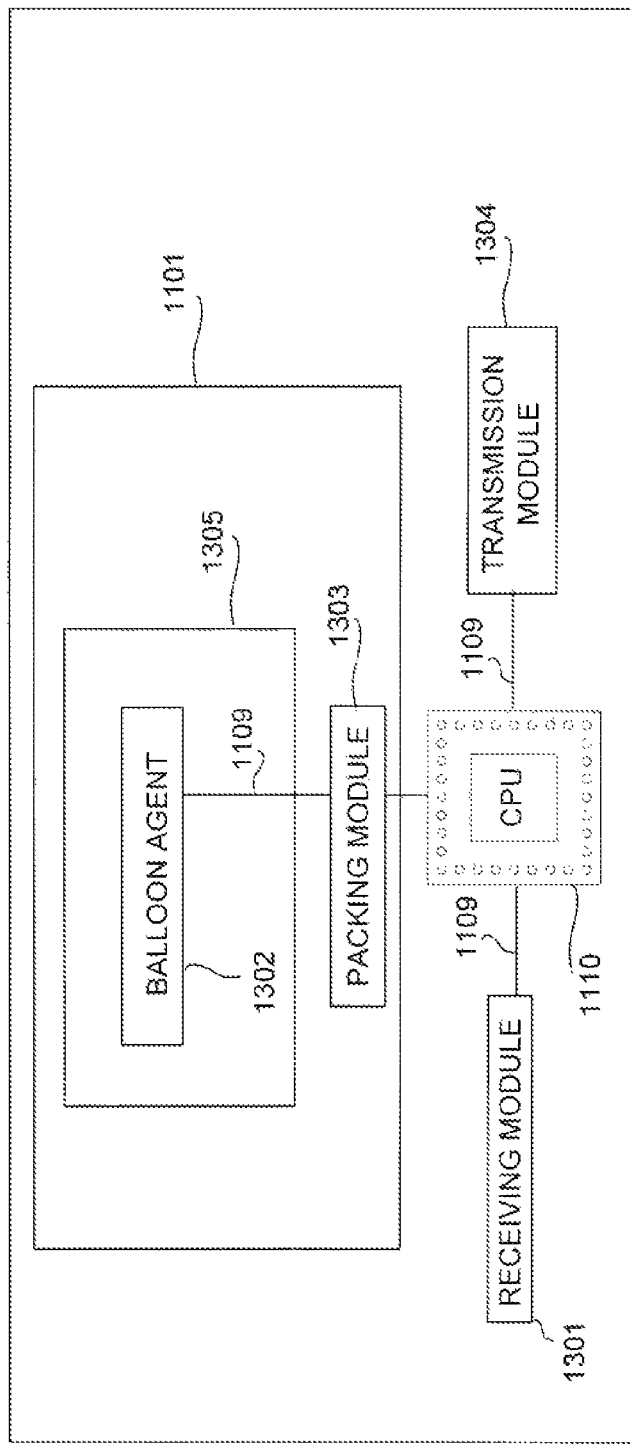
FIG. 13 is a block diagram of a computer system, according to an example embodiment, in the form of a compute blade that implements a balloon agent.

FIG. 13 is a block diagram of an example computer system in the form of the compute blade 102 that implements a balloon agent. These various blocks may be implemented in hardware, firmware, or software as part of the computer blade 101, or computer blade 102. Further, these various blocks are logically or physically connected. Illustrated is a receiving module 1301 that is executed to receive a balloon command using a receiving module residing on a hypervisor module managing at least one virtual machine 1305. A balloon command is a memory allocation command. Also shown is a balloon agent 1302 that resides on at least one virtual machine that is executed to allocate memory for the at least one virtual machine. A packing module 1303 is also shown that resides on the hypervisor module, the packing module 1303 executed to pack the allocated memory into contiguously organized memory. A transmission module 1304 is also shown that resides upon the hypervisor module, the transmission module 1304 executed to transmit pages between local and remote memory in order to achieve the packed, contiguously organized memory. In some example embodiment, the contiguous memory resides upon a memory blade.

FIG. 14 is a diagram of an example computer implemented method 1400 executed to swap virtual memory pages. The operations of the method 1400 may be implemented by, for example, a compute blade 102. Shown is an operation 1401 that is executed by the hypervisor module 1101 to compare a target memory size and a local memory size using a hypervisor module that resides upon a compute blade, the comparison based upon a unit of digital information for the target memory size and an additional unit of digital information for the local memory size. An operation 1402 is executed by the swapping module 1102 to swap a local virtual memory page with a remote virtual memory page using a swapping module that resides on the hypervisor module, the swapping based upon the comparing of the target memory size and the local memory size. An operation 1403 is executed by the transmission module 1103 to transmit the local virtual memory page to a memory blade using a transmission module that resides upon the compute blade. Operation 1404 is executed by the receiving module 1104 to receive the remote virtual memory page from the memory blade. In some example embodiments, the comparison includes at least one of an equivalence comparison, a greater than comparison, or a less than comparison. Additionally, in some example embodiments, the target memory size is defined by an application (e.g., a software application) executed on the compute blade. Some example embodiments include the local memory size is defined by an operating system managed by the hypervisor module, the operating system residing on the compute blade. Further, an operation 1405 is executed by the swapping module 1102 to swap the remote virtual memory page with a temporary local virtual memory page, the swapping based upon the comparing of the target memory size and the local memory size. Operation 1406 is executed by the page identification module 1105 to identify the remote virtual memory page as a super page using a page identification module residing on the hypervisor module. Operation 1407 is executed by the optimization module 1106 to process a portion of the super page. Operation 1408 is executed by the operating system module 1107 to execute an application, the execution including processing the portion of the super page as an instruction set for the application. In some example embodiments, the super page is a virtual memory page in excess of sixteen kilobytes. In some example embodiments, the compute blade includes logic architecture with at least one of a physical layer, a hypervisor layer, a virtual machine layer, or an application layer. Additionally, in some example embodiments, the memory blade includes a logical architecture with at least one of a protocol agent, a memory controller, address mapping, or accelerators.

Figure 15:
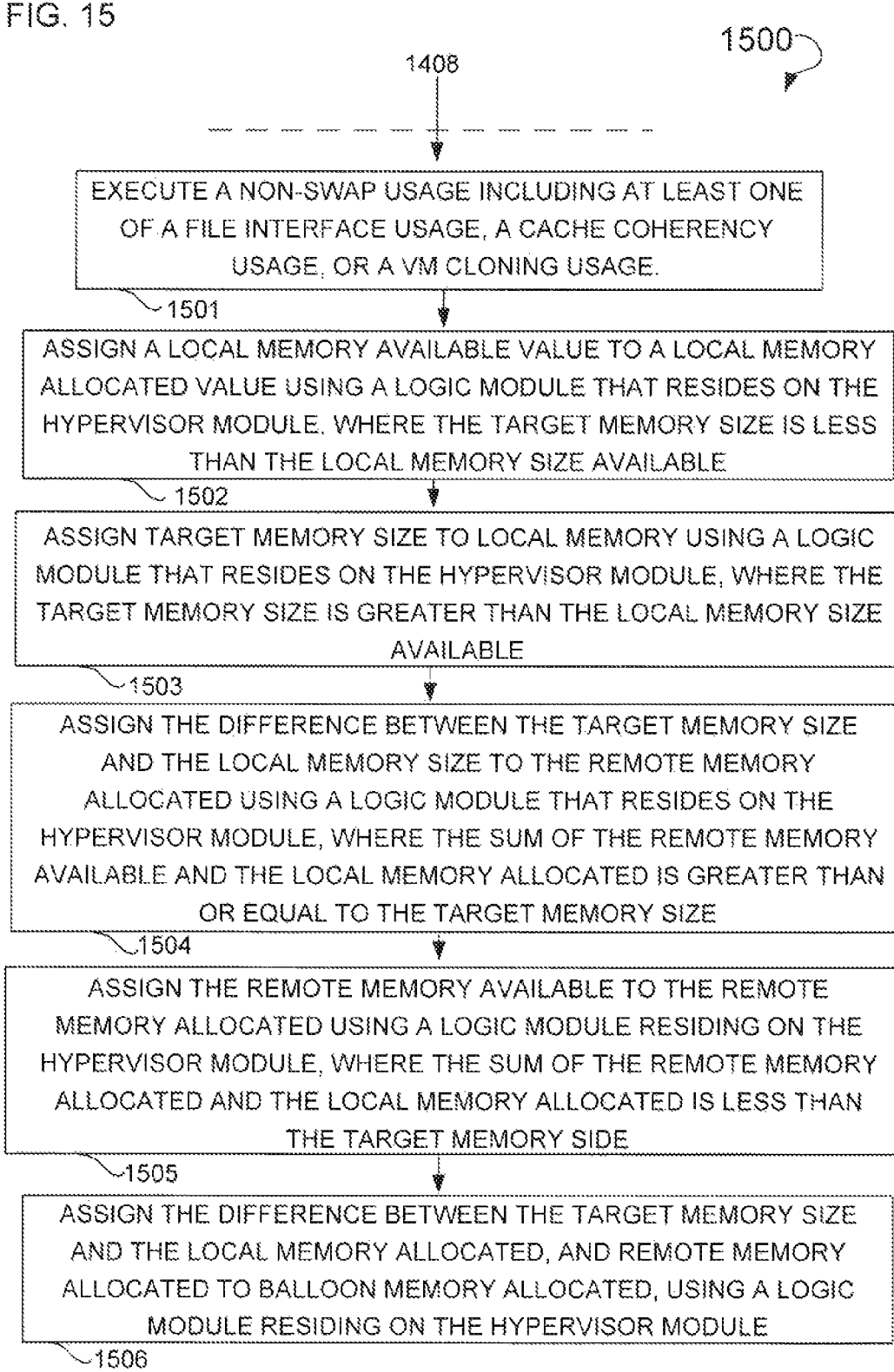
FIG. 15 is a diagram of a computer implemented method, according to an example embodiment, providing additional operations used in the method illustrated in FIG. 14.)

FIG. 15 is a flow chart illustrating an example method 1500 that continues the method 1100. Operation 1501 is executed by the logic module 1108 to execute a non-swap usage including at least one of a file interface usage, a cache coherency usage, or a VM cloning usage. Operation 1502 is executed by the logic module 1108 to assign a local memory available value to a local memory allocated value using a logic module that resides on the hypervisor module, where the target memory size is less than the local memory size available. Operation 1503 is executed by the logic module 1108 to assign target memory size to local memory using a logic module that resides on the hypervisor module, where the target memory size is greater than the local memory size available. Operation 1504 is executed by the logic module 1108 to assign the difference between the target memory size and the local memory size to the remote memory allocated using a logic module that resides on the hypervisor module, where the sum of the remote memory available and the local memory allocated is greater than or equal to the target memory size. Operation 1505 is executed by the logic module 1108 to assign the remote memory available to the remote memory allocated using a logic module residing on the hypervisor module, where the sum of the remote memory allocated and the local memory allocated is less than the target memory side. Operation 1506 is executed by the logic module 1108 to assign the difference between the target memory size and the local memory allocated, and remote memory allocated to balloon memory allocated, using a logic module residing on the hypervisor module.

Figure 16:
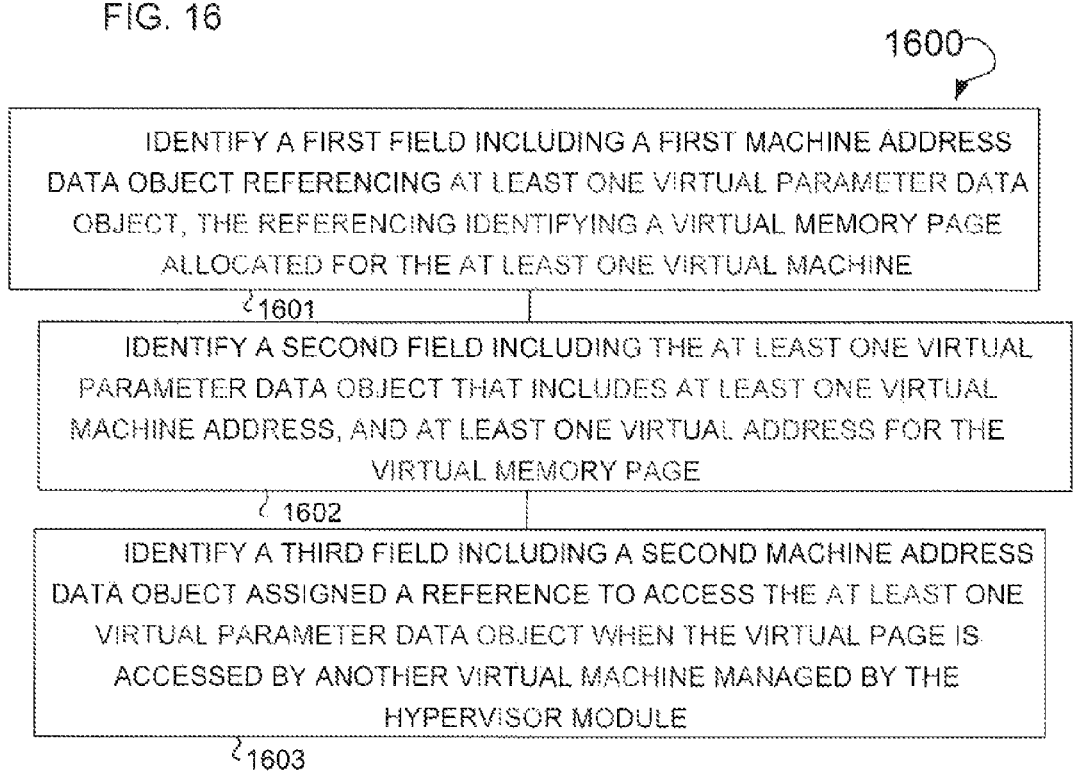
FIG. 16 is a diagram of a method, according to an example embodiment, implemented by a hypervisor for building a data structure that resides on a computer readable medium for mapping a MA to one or more virtual parameters.

FIG. 16 is a diagram of an example method 1600 implemented by a hypervisor for building a data structure that resides on a computer readable medium for mapping a MA to a one or more virtual parameters. An operation 1601 is executed to build a first field including a first machine address data object referencing at least one virtual parameter data object, the referencing identifying a virtual memory page allocated for the at least one virtual machine. An operation 1602 is executed to build a second field including the at least one virtual parameter data object that includes at least one virtual machine ID, at least one process ID, and at least one virtual address for the virtual memory page. Operation 1603 is executed to building a third field including a second machine address data object assigned a reference to access the at least one virtual parameter data object when the virtual page is accessed by another virtual machine managed by the hypervisor nodule. In some example embodiments, the first and second machine address data object is generated from a memory address using a technique including at least one of modulo arithmetic, or bit shifting. Additionally, in some example embodiments, the reference includes at least one of a memory location, or an adjacent memory cell.

Figure 17:
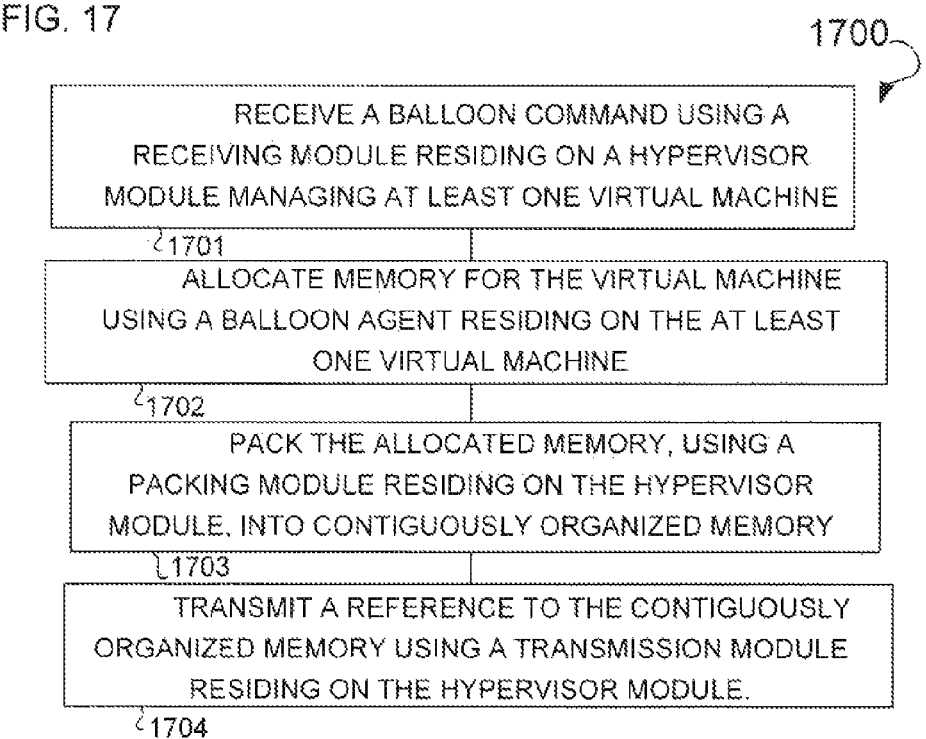
FIG. 17 is a diagram of a method, according to an example embodiment, used to facilitate memory packing.

FIG. 17 is a diagram of an example method 1700 used to facilitate memory packing. Illustrated is an operation 1701 executed by the receiving module 1301 to receive a balloon command. An operation 1702 is executed by the balloon agent 1302 to allocate memory for the virtual machine. Operation 1703 is executed by the packing module 1703 to pack the allocated memory into contiguously organized memory. Operation 1704 is executed by the transmission module 1704 to transmit a reference to the contiguously organized memory. In some example embodiments, the contiguous memory resides upon a memory blade.

Figure 18:
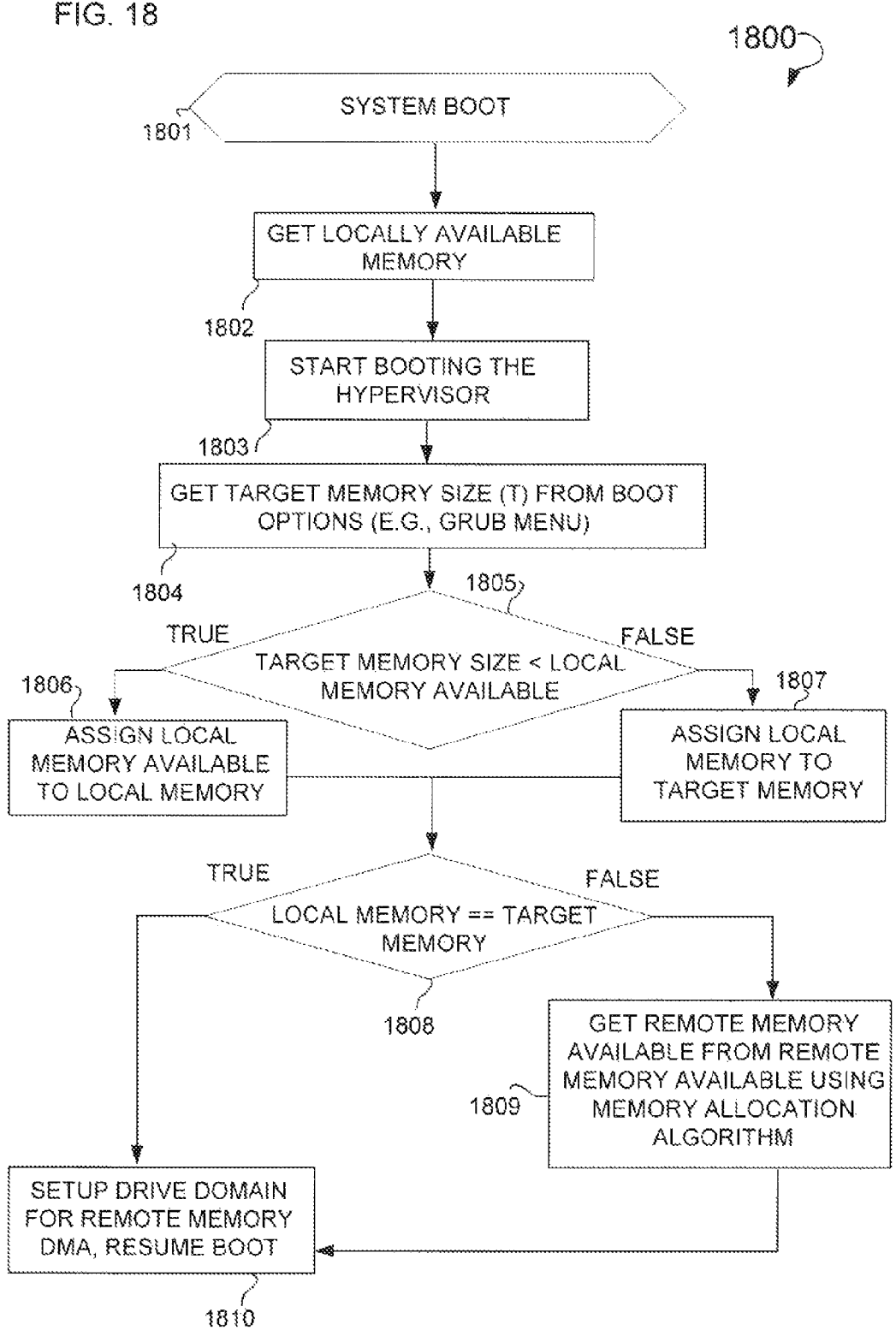
FIG. 18 is a flowchart illustrating a method, according to an example embodiment, used to facilitate the boot sequence for a compute blade to swap virtual pages with a memory blade.

FIG. 18 is a flowchart illustrating an example method 1800 used to facilitate the boot sequence for a compute blade to swap virtual pages with a memory blade. Illustrated are operations 1801 through 1803 that are executed by, for example, the physical layer 203. Further, illustrated are operations 1804 through 1809 that are executed by, for example, the hypervisor 202. Additionally, illustrated is an operation 1810 is executed by, for example, the physical layer 203. In some example embodiments, the execution of operations 1801 through 1810 are implemented to partition the physical memory addresses of a server between local, remote and ballooned segments as orchestrated by the hypervisor 202. Operation 1801 is executed to facilitate a system boot were initialization instructions are provided to a processor. Operation 1802 is executed to retrieve locally available memory for the processor. Operation 1803 is executed to boot, or otherwise initiate, a hypervisor such as hypervisor 202. In some example embodiments; when a server boots up, the BIOS firmware first detects the amount of locally installed memory available ("La"), the hypervisor reads in the target memory allocation size ("T") specified either in the user-defined user menu or Basic Input/output System (BIOS) based configuration. Operation 1804 is executed to retrieve a target memory size from the boot options. The target memory size is for a particular application executed upon one of the operating systems is managed by the hypervisor 202. A decisional operation 1805 is executed to determine whether the target memory size is less than the local memory available. In cases where decisional operation 1805 evaluates to "true," an operation 1806 is executed. In cases where decisional operation 1805 evaluates to "false," an operation 1807 is executed. Operation 1806, when executed, assigns the local memory available (e.g., a pointer or reference to this local memory) to a local memory variable. Operation 1807, when executed, assigns a local memory value (e.g., a pointer or reference to this value) to a target memory variable. A decisional operation 1808 is executed to determine whether local memory is equivalent (=) to target memory. In cases where decisional operation 1808 evaluates to "true," operation 1810 is executed. In instances where decisional operation 1808 evaluates to "false," an operation 1809 is executed. Operation 1809, when executed, gets or retrieves remote memory using a memory allocation algorithm. Operation 1810, when executed, sets up a drive domain for a remote memory Direct Memory Access (DMA), and then resumes the sequence for a particular compute blade. A drive domain may be a software driver.

In some example embodiments, the hypervisor 202 satisfies the capacity requirement of "T" by requesting memory from local memory, remote memory and ballooned memory. When the sum of available local and remote memory is smaller than "T," part of the requested physical address space will have to be stored on main memory or persistent storage. This may be necessary because there is not enough local and remote DRAM. This type of memory is referenced herein as balloon memory. As the total memory capacity of, for example, the memory blade 103 is reallocated dynamically, it is also possible for a given compute blade's memory to grow and shrink accordingly.

Figure 19:
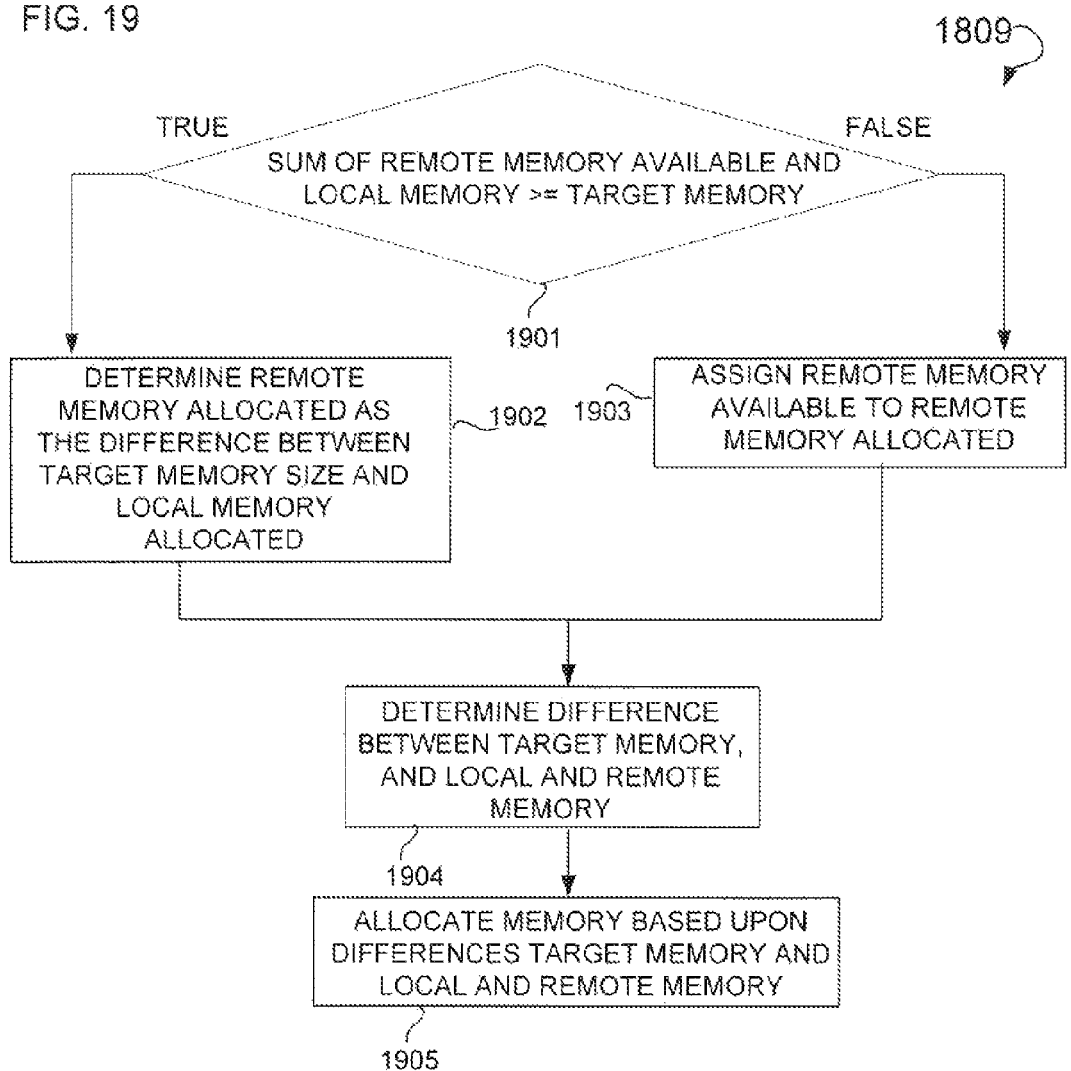
FIG. 19 is a flowchart illustrating the execution of operation, according to an example embodiment to get remote memory using a memory allocation algorithm.

FIG. 19 is a flowchart illustrating the execution of an example operation 1509. Shown is a decisional operation 1901 that determines whether the sum of the remote memory available and local memory is less than or equal to target memory (e.g., "T"). In cases where decisional operation 1901 evaluates to "true," an operation 1902 is executed. In cases where decisional operation 1901 evaluates to "false," an operation 1903 is executed. Operation 1902, when executed, determines the remote memory allocated by the memory blade 103. This allocated memory is determined as the difference between a target memory size (e.g., "T"), and local memory allocated (e.g., "La"). Operation 1903, when executed, assigns a remote memory available value to the remote memory allocated value. The operation 1904, when executed, determines a difference between a target memory size, and a local and remote memory size. Operation 1905, when executed, allocates memory based upon the differences between target memory (e.g. "T") and the sum of local and remote memory.

FIG. 20 is a flowchart illustrating the execution of an example method 2000 used to migrate local and remote memory. Illustrated are operations 2001 through 2003 executed by the physical layer 202. Further, illustrated are operations 2004 through 2007 that are executed by the hypervisor 203. Operation 2001 is executed by a processor (e.g., an x86 series Central Processing Unit (CPU)) to facilitate the loading or storing operation. Operation 2002 is executed to traverse a Transition Lookaside Buffer (TLB) to determine whether local memory pages are indexed within the TLB. Where a virtual memory page is not present, an exception is thrown, and an operation 2003 is executed. Operation 2003, when executed, traps the program execution flow into the hypervisor 203. In some example embodiments, the hypervisor detects a remote memory access when the target memory address is larger than local memory size, and initiate a local/remote page swapping operation. Operation 2004 is executed to choose a local page frame from a free page frame pool. Free pages selected from the free page frame pool can be allocated for by the hypervisor 203 for use by application residing or otherwise executed by one of the above referenced operating systems. Operation 2005 is executed to initiate the migration of the remote page into a local page. Operation 2006 is executed to select a local victim, and to migrate this local victim page, and the data included therein, into a remote page. The victim page selection criteria may be random by MA, locality based where the least likely access local page is chosen according to page access history, page size based, or based on other suitable metrics. Operation 2007 is executed to update the MAs of the incoming and victim pages using, for example, the MA to virtual parameter mapping data structure, and invalid the victim page TLB entries to ensure correct accesses. The system used to implement this method 2000 is illustrated in the example FIGS. 4 and 5.

FIG. 21 is a flowchart illustrating an execution of an example method 2100 that shows additional operations that are included as a part of the method 2000. Illustrated are various operations 2101 through 2106 that are executed by the hypervisor 202. Shown is a decisional operation 2101 that determines whether a particular virtual memory page is a super page. A super page is a page of virtual memory that is greater than the regular 4 KB page size. In cases where decisional operation 2101 evaluates to "true," a further decisional operation 2102 is executed. In cases where decisional operation 2101 evaluates to "false" an operation 2103 is executed. Decisional operation 2102 determines whether a super page optimization algorithm is to be executed. In cases where decisional operation 2102 is executed, the operation 2103 is executed. Operation 2104, when executed, implements a super page optimization algorithm. Example super page optimization algorithms include, for example, an early restart algorithm, a request first word algorithm, or some other suitable algorithm. Operation 2103, when executed, pause process execution until an entire virtual page is transferred. Operation 2105 is executed to initiate Error Correction Code (ECC) based processing of a sub page. Operation 2106 is executed to resume a normal execution of a process associated with an application running on one of the aforementioned operating systems.

In some example embodiments, operations 2002 through 2007 are implemented in the following manner. The "present" bits of all the page table entries for remote pages (e.g., those with physical addresses higher than L, assuming higher addresses are stored remotely) are utilized in the execution of operation 2002. The present bit is set to 1 when the page is ready for access. The setting of the present bit can occur before the entire page is transferred. When the CPU accesses a page with its present bit cleared (e.g., set to 0), it will trap into a page fault handler as part of the hypervisor implementation. This trapping process is outlined at operation 2003. As alluded to at operation 2004, after the control flow is switched to the hypervisor, the hypervisor chooses a local page frame from a small buffer pool of free pages to store the incoming remote page. This incoming remote page may be the virtual memory page 402. Operation 2005 is executed by the hypervisor to initiate a page transfer command for the memory blade 103. Further, as alluded to above, operation 2006 is executed to enable the hypervisor to schedule the transfer of a victim page to the remote page frame. In some example embodiments, the actual transfer can happen later. Some example cases may include the return of the victim page frame back to the buffer pool of free local pages, as reflected in the execution of operation 2007.

FIG. 22 is a diagram of an example data structure 303 used to map machine addresses to virtual parameters. In some example embodiments, data structure 303 resides on the hypervisor 202. This data structure 303 is used to track which VA or PA addresses in which virtual machines, and associated page tables, are mapped to a given MA. As depicted, this data structure is a contiguous array. However, in some example embodiments, this data structure may be a hash table, digital tree, or other suitable data structure. Shown is an MA indexing value 2201 that is mapped to one or more virtual parameters 2202. This MA indexing value may be generated through applying modulo arithmetic, bit shifting, or some other suitable technique to a memory address. In some example embodiments, the organization of the data structure 303 varies based upon the type of virtualization implemented via the hypervisor. In cases where paravirtualization is implemented the MA will map to a VMID, a processID (PID), and VAs. Further, in cases where full-virtualization is implemented a shadow page table with virtual VMIDs, processIDs, and VAs is utilized.

Figure 23:
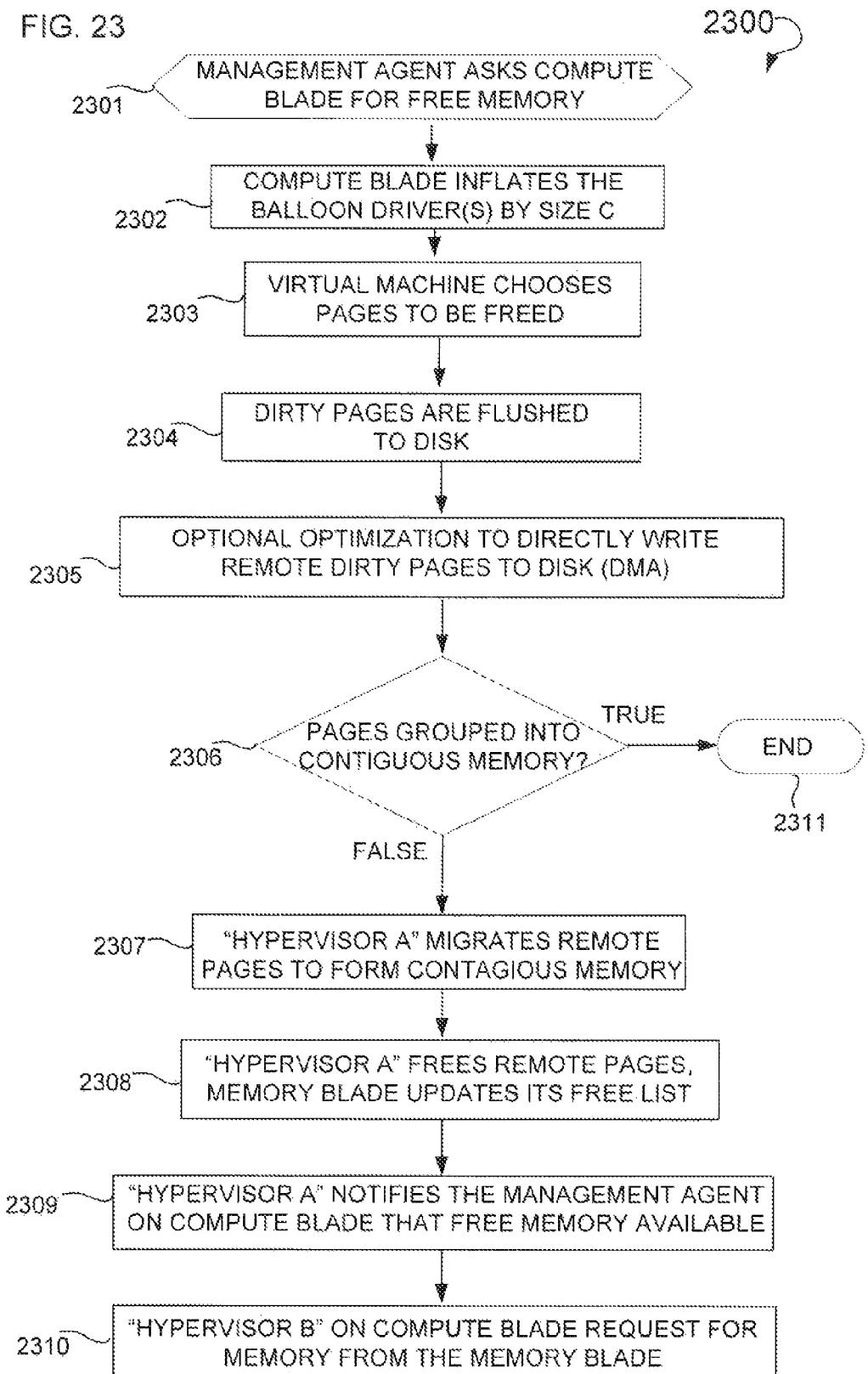
FIG. 23 is a flowchart illustrating execution of a method, according to an example embodiment, used to implement balloon based memory re-allocation.

FIG. 23 is a flowchart illustrating execution of an example method 2300 used to implement balloon based memory allocation. Shown are the operations 2301 through 2302 that are executed by the hypervisor 202. Additionally illustrated, are operations 2303 through 2305 that are executed by an OS such as OS 205. Further illustrated are operations 2306 through 2309 executed by the hypervisor 202. Additionally, illustrated is an operation 2310 executed by the hypervisor 606. Operation 2301 is executed to allow the management agent 208 to send the memory capacity command 703 to the memory blade 103. An operation 2302 is executed by the hypervisor 202 to instruct the balloon driver 301 to request additional memory. Operation 2303 is executed by the OS to select pages to be freed. Operation 2304 is executed to flush dirty pages to main memory. Operation 2305 is executed to optionally optimize to directly write pages to main memory from the OS. A decisional operation 2306 is executed to determine whether virtual memory pages are grouped into contiguous memory. In cases where decisional operation 2306 evaluates to "true," the termination operation 2311 is executed. In cases where decisional operation 2306 evaluates to "false," operation 2307 is executed. Operation 2307, when executed, migrates and packs remote virtual memory pages into contiguous memory. Operation 2308 is executed to free remote virtual memory pages, and to facilitate the updating of the free list tracking these virtual memory pages as free. Operation 2309 is executed by the hypervisor to notify the management agent 302 that the free memory is available. Operation 2310 is executed by a hypervisor, such as hypervisor 606, to request memory in the form of optimized allocated memory 802. In some example embodiments, memory is ballooned and allocated as reflected in FIGS. 7 and 8.

In some example embodiment, the method 2300 implements a process for VM ballooning based capacity resizing, where memory capacity is taken away from compute blade 102 and given to compute blade 101. Both compute blade 101 and 102 may be operatively coupled to the same memory blade 103. In one example embodiment, operation 2301 is executed to facilitate the management agent 302 requesting that virtual memory capacity be taken from compute blade 102 and given to compute blade 101. Operation 2302 is executed to instruct the hypervisor 202 to inflate the balloon driver 301 (e.g., to instruct the balloon driver to request that memory be allocated). Operation 2303 is executed to instruct the OS 205 supervised by the hypervisor 202 to free up virtual memory pages. The free pages are allocated to the balloon driver 301. Operation 2304 is executed to flush dirty pages to main memory via copying these dirty pages into a local buffer and flushing these dirty pages to main memory. Operation 2305 is executed to optionally instruct the hypervisor to setup the disk device driver to directly writing remote virtual memory pages into main memory. When executed, operation 2307 returns a list of free pages to the hypervisor 202 from the balloon driver 301 as contiguous memory. This contiguous memory resides on the memory blade 103. In some example embodiments, through the execution of operation 2308, the hypervisor 202 initiates a remote-to-local page copy; for a remote non-contiguous page, the hypervisor 202 asks the memory blade 103 to do a page copy within itself. Such copies eventually create a large chunk of free space on the memory blade, as illustrated at 703. Operation 2309 is executed by the hypervisor 202 to request the memory blade free remote pages, and record these virtual memory pages as part of its ballooned memory. Operation 2310 is executed to notify the hypervisor 606 about the availability of remote pages.

Figure 24:
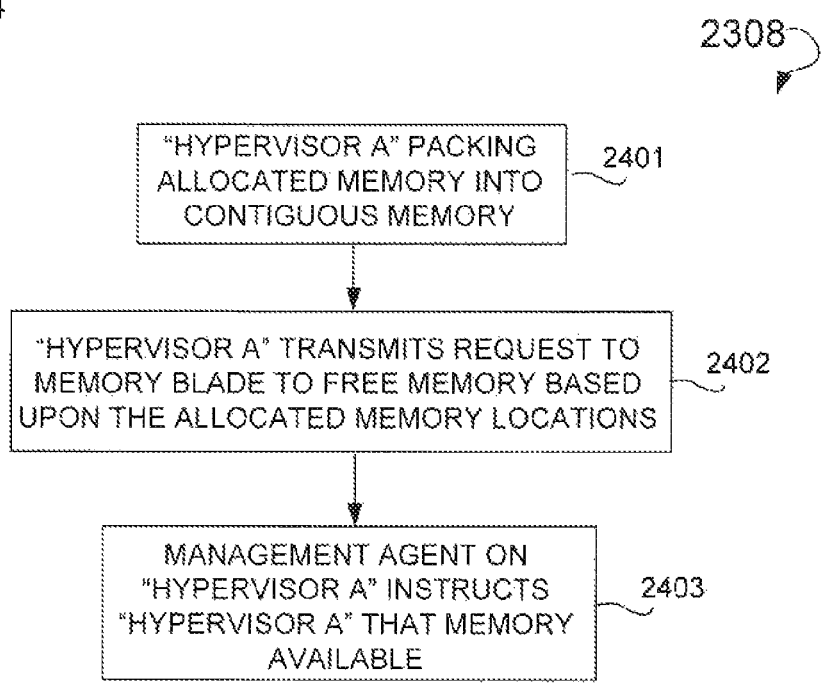
FIG. 24 is a flowchart illustrating execution of operation, according to an example embodiment, executed to free remote virtual memory pages, and to facilitate the updating of the free list tracking these virtual memory pages as free.

FIG. 24 is a flowchart illustrating execution of operation 2208. Shown is an operation 2401 that, when executed, facilitates the hypervisor 202 packing the memory allocated by the balloon driver 301 into the contiguous memory 703. Operation 2402 is executed to by the hypervisor 202 to request memory locations on the memory blade 103. Operation 2403 is executed to facilitate the management agent 208 notifying the hypervisor 606 that the contiguous memory 803 is available for use.

FIG. 25 is a diagram of an example computer system 2500. Shown is a CPU 2501. The processor die 201 may be a CPU 2501. In some example embodiments, a plurality of CPU may be implemented on the computer system 2500 in the form of a plurality of core (e.g., a multi-core computer system), or in some other suitable configuration. Some example CPUs include the x86 series CPU. Operatively connected to the CPU 2501 is Static Random Access Memory (SRAM) 2502. Operatively connected includes a physical or logical connection such as, for example, a point to point connection, an optical connection, a bus connection or some other suitable connection. A North Bridge 2504 is shown, also known as a Memory Controller Hub (MCH), or an Integrated Memory Controller (IMC), that handles communication between the CPU and PCIe, Dynamic Random Access Memory (DRAM), and the South Bridge. A PCIe port 2503 is shown that provides a computer expansion port for connection to graphics cards and associated GPUs. An ethernet port 2505 is shown that is operatively connected to the North Bridge 2504. A Digital Visual Interface (DVI) port 2507 is shown that is operatively connected to the North Bridge 2504. Additionally, an analog Video Graphics Array (VGA) port 2506 is shown that is operatively connected to the North Bridge 2504. Connecting the North Bridge 2504 and the South Bridge 2511 is a point to point link 2509. In some example embodiments, the point to point link 2509 is replaced with one of the above referenced physical or logical connections. A South Bridge 2511, also known as an I/O Controller Hub (ICH) or a Platform Controller Hub (PCH), is also illustrated. Operatively connected to the South Bridge 2511 are a High Definition (HD) audio port 2508, boot RAM port 2512, PCI port 2510, Universal Serial Bus (USB) port 2513, a port for a Serial Advanced Technology Attachment (SATA) 2514, and a port for a Low Pin Count (LCP) bus 2515. Operatively connected to the South Bridge 2511 is a Super Input/Output (I/O) controller 2516 to provide an interface for low-bandwidth devices (e.g., keyboard, mouse, serial ports, parallel ports, disk controllers). Operatively connected to the Super I/O controller 2516 is a parallel port 2517, and a serial port 2518.

The SATA port 2514 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 2502 and/or within the CPU 2501 during execution thereof by the computer system 2500. The instructions may further be transmitted or received over the 10/100/1000 ethernet port 2505, USB port 2513 or some other suitable port illustrated herein.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Data and instructions (of the software) are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A non-transitory computer-readable storage medium having computer-executable instructions stored thereon and executable by a processor to:
   compare a target memory size and a local memory size using a hypervisor module that resides upon a compute blade, the comparison based upon a unit of digital information for the target memory size and an additional unit of digital information for the local memory size;
   swap a local virtual memory page with a remote virtual memory page via a communication channel passing through a backplane using a swapping module that resides on the hypervisor module, the swapping based upon the comparing of the target memory size and the local memory size;

overwrite a victim page of the compute blade with the swapped remote virtual memory page, wherein the victim page is selected by the hypervisor module;

store data of the victim page of the compute blade via a temporary page on the compute blade; and transmit the local virtual memory page to a memory blade via the communication channel passing through the backplane using a transmission module that resides upon the compute blade.

2. The non-transitory computer-readable storage medium of claim 1, further comprising computer-executable instructions stored thereon and executable by a processor to receive the remote virtual memory page from the memory blade, using a receiving module that resides on the compute blade.

3. The non-transitory computer-readable storage medium of claim 1, wherein the local memory size is defined by an operating system managed by the hypervisor module, the operating system residing on the compute blade.

4. The non-transitory computer-readable storage medium of claim 1, further comprising computer-executable instructions stored thereon and executable by a processor to swap the remote virtual memory page with a temporary local virtual memory page using the swapping module that resides on the hypervisor module, the swapping based upon the comparing of the target memory size and the local memory size.

5. The non-transitory computer-readable storage medium of claim 1, further comprising computer-executable instructions stored thereon and executable by a processor to:

identify the remote virtual memory page as a super page using a page identification module residing on the hypervisor module;

process a portion of the super page using an optimization module residing on the hypervisor module; and execute an application managed by an operating system managed by the hypervisor module, the execution including processing the portion of the super page as an instruction set for the application.

6. The non-transitory computer-readable storage medium of claim 1, wherein the memory blade includes a logical architecture with at least one of a protocol agent, a memory controller, address mapping, and accelerators.

7. The non-transitory computer-readable storage medium of claim 6, wherein the address mapping is based upon considerations including at least one of electrical power consumption, and thermal generation.

\* \* \* \* \*